US011095382B2

(12) United States Patent
Yoneda et al.

(10) Patent No.: US 11,095,382 B2
(45) Date of Patent: Aug. 17, 2021

(54) COMMUNICATION SYSTEM, COMMUNICATION DEVICE AND COMMUNICATION METHOD

(71) Applicant: OMRON Corporation, Kyoto (JP)

(72) Inventors: Mitsuhiro Yoneda, Tenri (JP); Shigenori Sawada, Takatsuki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,586

(22) PCT Filed: Jan. 29, 2019

(86) PCT No.: PCT/JP2019/002983
§ 371 (c)(1),
(2) Date: Mar. 1, 2020

(87) PCT Pub. No.: WO2019/163443
PCT Pub. Date: Aug. 29, 2019

(65) Prior Publication Data
US 2020/0244381 A1   Jul. 30, 2020

(30) Foreign Application Priority Data
Feb. 22, 2018  (JP) .............................. JP2018-029471

(51) Int. Cl.
*H04J 3/06* (2006.01)
(52) U.S. Cl.
CPC .................................. *H04J 3/0635* (2013.01)
(58) Field of Classification Search
None
See application file for complete search history.

(56) References Cited

U.S. PATENT DOCUMENTS

| 2015/0139038 A1* | 5/2015 | Riederer | H04L 41/12 370/256 |
| 2016/0080100 A1 | 3/2016 | Yan et al. | |

(Continued)

FOREIGN PATENT DOCUMENTS

| JP | 2016-116143 A | 6/2016 |
| JP | 2017-050730 A | 3/2017 |

OTHER PUBLICATIONS

An English translation of the International Search Report("ISR") of PCT/JP2019/002983 dated Mar. 5, 2019.
(Continued)

*Primary Examiner* — Chi H Pham
*Assistant Examiner* — Vladislav Y Agureyev
(74) *Attorney, Agent, or Firm* — Metrolex IP Law Group, PLLC

(57) ABSTRACT

A communication system according to one aspect of the present disclosure is a communication system in which a plurality of communication devices are connected to a network. The plurality of communication devices include a time master including a master clock that manages time of the communication system and a plurality of time slaves each of which includes a slave clock time-synchronized with the master clock. Each of the plurality of time slaves includes a synchronization unit that performs time synchronization with another communication device connected adjacent to a master side on the network and a communication unit that notifies the time master of time synchronization information indicating time synchronization accuracy of the own device obtained by the synchronization unit.

11 Claims, 25 Drawing Sheets

(56) References Cited

U.S. PATENT DOCUMENTS

| | | | |
|---|---|---|---|
| 2016/0095078 A1* | 3/2016 | Yamada | H04L 12/437 370/242 |
| 2017/0064661 A1 | 3/2017 | Katagiri et al. | |
| 2018/0062780 A1* | 3/2018 | Shimizu | H04J 3/0644 |
| 2018/0076949 A1* | 3/2018 | Mayer | H04L 7/0075 |
| 2018/0287688 A1* | 10/2018 | Otsu | H04L 7/00 |
| 2019/0116021 A1* | 4/2019 | Tanwar | H04J 3/0673 |
| 2020/0169345 A1* | 5/2020 | Andersson | H04J 3/0673 |
| 2020/0396050 A1* | 12/2020 | Perras | H04B 10/516 |

OTHER PUBLICATIONS

The Written Opinion("WO") of PCT/JP2019/002983 dated Mar. 5, 2019.

* cited by examiner

COMMUNICATION SYSTEM, COMMUNICATION DEVICE AND COMMUNICATION METHOD

TECHNICAL FIELD

The present disclosure relates to a communication system in which a plurality of communication devices are connected to a network, the communication device, and a communication method.

BACKGROUND ART

Control devices such as a PLC (Programmable Logic Controller) are widely used as a main component implementing various kinds of FA (Factory Automation). The control device transmits and receives data to and from one or a plurality of devices through a bus or a network.

When the plurality of devices are connected through the bus or the network, a delay is generated due to data transmission. Magnitude of a transmission delay varies depending on a position where the device is connected. Depending on the variation in the delay time, there is a possibility that the timing at which the device acquires the input data and the timing at which the device outputs the output data vary.

Regarding the problem, Japanese Patent Laying-Open No. 2016-116143 (PTL 1) discloses a method for monitoring time synchronization in a communication system including a time master and one or a plurality of time slaves connected through a network. The time synchronization monitoring method disclosed in PTL 1 adopts a high-accuracy time synchronization protocol called PTP (Precision Time Protocol) defined in IEEE (Institute of Electrical and Electronics Engineers) 1588. In the PTP, a time synchronization packet is periodically exchanged between the time master and the time slave, and time of the time slave is corrected based on information obtained in the process.

CITATION LIST

Patent Literature

PTL 1: Japanese Patent Laying-Open No. 2016-116143

SUMMARY OF INVENTION

Technical Problem

However, a sequence notifying the time master of time synchronization accuracy of each time slave does not exist in the PTP, so that the time master cannot determine whether the time synchronization of the time slave is completed.

For this reason, in PTL 1, information indicating the time the time slave transmits the packet is included in the time synchronization packet transmitted from the time slave to the time master. This enables the time master to determine whether the time synchronization of the time slave is completed based on the difference between the time the packet is received and the time the packet is transmitted.

There is P2P (Peer to Peer) as a connection form of the PTP. In the P2P, two adjacent communication devices have a relationship of a master and a slave to perform time synchronization processing. In the P2P, each communication device measures a delay time with a communication device located adjacent to a master side using a Peer delay mechanism, and corrects the time of the own device based on the measured delay time.

When the time synchronization monitoring method disclosed in PTL 1 is applied to the time synchronization processing in which the P2P is used, the time master receives the time synchronization packet including the time information from the nearest time slave, which allows the time master to determine whether the time synchronization of the time slave is completed. On the other hand, because the time synchronization packet is not exchanged between the time master and other time slaves that are not directly connected to the time master, the time master cannot determine whether the time synchronization of other time slaves is completed. As a result, for example, after the communication system is powered on, the time master cannot determine the timing at which the data transmission with the plurality of time slaves can be started.

Thus, there is a demand for a communication system capable of determining that the time synchronization is completed among the plurality of communication devices.

Solution to Problem

A communication system according to one aspect of the present disclosure is a communication system in which a plurality of communication devices are connected to a network. The plurality of communication devices include a time master including a master clock that manages time of the communication system and a plurality of time slaves each of which includes a slave clock time-synchronized with the master clock. Each of the plurality of time slaves includes a synchronization unit that performs time synchronization with another communication device connected adjacent to a master side on the network and a communication unit that notifies the time master of time synchronization information indicating time synchronization accuracy of the own device obtained by the synchronization unit.

With this configuration, the time master can determine whether the time synchronization between the own device and the plurality of time slaves is completed based on the time synchronization information of which each time slave notifies the time master. As a result, the data transmission can be started in timing of completing the time synchronization in the entire communication system. Thus, the data transmission can more quickly be started as compared with a configuration in which the data transmission is started in timing at which the set time elapses after the communication system is powered-on. During the performance of the data transmission, the time master can monitor the time synchronization accuracy of each of the plurality of time slaves based on the time synchronization information of which each time slave notifies the time master, so that the data transmission can immediately be stopped when the time lag with any one of the time slaves is generated. This enables avoidance of a possibility that the timing at which the time slave acquires input data and the timing at which the time slave outputs output data vary depending on the time lag.

In the communication system, preferably the synchronization unit corrects time of the own device using a difference between time of the other communication device and the time of the own device as a time adjustment value, and the communication unit notifies the time master of the time adjustment value as the time synchronization information.

With this configuration, each time slave can notify the time master of the time synchronization information of the own device using the time adjustment value used in the time synchronization processing of the own device.

In the communication system, preferably the communication unit receives the time adjustment value from another communication device connected adjacent to a slave side on the network, and transfers the time adjustment value having a greater one in absolute values of the received time adjustment value and the time adjustment value of the own device to the other communication device connected adjacent to the master side.

With this configuration, the time master can be notified of the maximum value of the time adjustment values of the plurality of time slaves, namely, the worst value of the time synchronization accuracy. Thus, the time master can determine whether the time synchronization of the plurality of time slaves is completed based on the worst value of the time synchronization accuracy.

In the communication system, preferably the communication unit receives the time adjustment value from another communication device connected adjacent to a slave side on the network, and transfers the received time adjustment value and the time adjustment value of the own device to the other communication device connected adjacent to the master side.

With this configuration, the time master can be notified of the time adjustment values of all the time slaves. Thus, the time master can determine whether the time synchronization of all the plurality of time masters is completed based on the notified time synchronization information.

In the communication system, preferably the communication unit receives the time adjustment value from another communication device connected adjacent to a slave side on the network, and transfers a sum of the received time adjustment value and the time adjustment value of the own device to the other communication device connected adjacent to the master side.

With this configuration, the time master can be notified of the time difference between each time slave and the time master. The time master can determine whether or not the time synchronization of the plurality of time slaves is completed based on the time difference between the own device and each time slave.

In the communication system, preferably the synchronization unit periodically performs time synchronization processing of correcting the time of the own device by exchanging a time synchronization packet with the other communication device, and the communication unit stores the time adjustment value to be transferred to the other communication device in the time synchronization packet to be transmitted to the other communication device.

With this configuration, the time synchronization information is included in the time synchronization packet transmitted to the communication device located on the master side, which allows the communication unit to be constructed using the existing time synchronization sequence. Consequently, the increase in the number of packets exchanged between the communication devices during the performance of the time synchronization processing in order to construct the communication unit can be prevented.

In the communication system, preferably the time master is a control device configured to manage data transmission in the network, each of the plurality of time slaves is a device configured to perform the data transmission according to an instruction from the control device, and the control device determines whether the time synchronization with the plurality of devices is completed based on the time synchronization information of which the plurality of devices notify the control device, and starts the data transmission in the network when determining that the time synchronization is completed.

With this configuration, the control device in the communication system functions as the time master, whereby the control device can quickly start the data transmission when the determination that the time synchronization of the plurality of devices functioning as the time slave is completed is made.

In the communication system, preferably one of the plurality of time slaves is a control device configured to manage data transmission in the network, the remaining time slaves and the time master are each a device configured to perform the data transmission according to an instruction from the control device, the time master determines whether the time synchronization with the plurality of time slaves is completed based on the time synchronization information of which the plurality of time slaves notify the time master, and notifies the control device of a determination result, and the control device starts the data transmission in the network when determining that the time synchronization is completed from the determination result.

With this configuration, even in the configuration in which a device except for the control device in the communication system functions as the time master, the control device quickly can start the data transmission according to the determination result of the time synchronization completion of which the device notifies the control device.

In the communication system, preferably one of the plurality of time slaves is a control device configured to manage data transmission in the network, the remaining time slaves and the time master are each a device configured to perform the data transmission according to an instruction from the control device, the time master transfers the time synchronization information of which the plurality of time slaves notify the time master to the control device, and the control device determines whether the time synchronization with the plurality of devices is completed based on the time synchronization information, and starts the data transmission in the network when determining that the time synchronization is completed.

With this configuration, even in the configuration in which a device except for the control device in the communication system functions as the time master, the control device can quickly start the data transmission when the time synchronization completion is determined based on the time synchronization information of which the device notifies the control device.

In the communication system, preferably the synchronization unit periodically performs time synchronization processing of correcting the time of the own device by exchanging a time synchronization packet with the other communication device, and the communication unit notifies the time master of the time synchronization information after the performance of the time synchronization processing.

With this configuration, during the performance of the time synchronization processing, the time synchronization packet and the data indicating the time synchronization information can be prevented from colliding with each other on the network.

A communication device according to another aspect of the present disclosure is a communication device network-connected to a communication system. The communication device includes: a slave clock time-synchronized with a master clock configured to manage time of the communication system; a synchronization unit configured to perform time synchronization with another communication device connected adjacent to a master side on the network; and a communication unit configured to notify a time master including the master clock of time synchronization information indicating time synchronization accuracy of the own device obtained by the synchronization unit.

With this configuration, the time master can determine whether the time synchronization between the own device and the plurality of communication devices is completed based on the time synchronization information of which each communication device notifies the time master. As a result, the data transmission can be started in timing of completing the time synchronization in the entire communication system. During the performance of the data transmission, the time master can monitor the time synchronization accuracy of each of the plurality of communication devices based on the time synchronization information of which each communication device notifies the time master, so that the data transmission can quickly be stopped when the time lag with any one of the communication devices is generated. This enables avoidance of a possibility that the timing at which the communication device acquires input data and the timing at which the communication device outputs output data vary depending on the time lag.

A communication method according to still another aspect of the present disclosure is a communication method in a communication system in which a plurality of communication devices are connected to a network. The plurality of communication devices include a time master including a master clock that manages time of the communication system and a plurality of time slaves each of which includes a slave clock time-synchronized with the master clock. The communication method includes: time-synchronizing each of the plurality of time slaves with another communication device connected adjacent to a master side on the network; and notifying, by each of the plurality of time slaves, the time master of time synchronization information indicating time synchronization accuracy of the time slave.

With this configuration, the time master can determine whether the time synchronization between the own device and the plurality of time slaves is completed based on the time synchronization information of which each time slave notifies the time master. As a result, the data transmission can be started in timing of completing the time synchronization in the entire communication system. During the performance of the data transmission, the time master can monitor the time synchronization accuracy of each of the plurality of time slaves based on the time synchronization information of which each time slave notifies the time master, so that the data transmission can immediately be stopped when the time lag with any one of the time slaves is generated. This enables avoidance of a possibility that the timing at which the time slave acquires input data and the timing at which the time slave outputs output data vary depending on the time lag.

Advantageous Effects of Invention

According to the aspects of the present disclosure, in a communication system in which the plurality of communication devices are connected to the network, it is possible to determine that the time synchronization is completed among the plurality of communication devices.

DESCRIPTION OF EMBODIMENT

Figure 1:
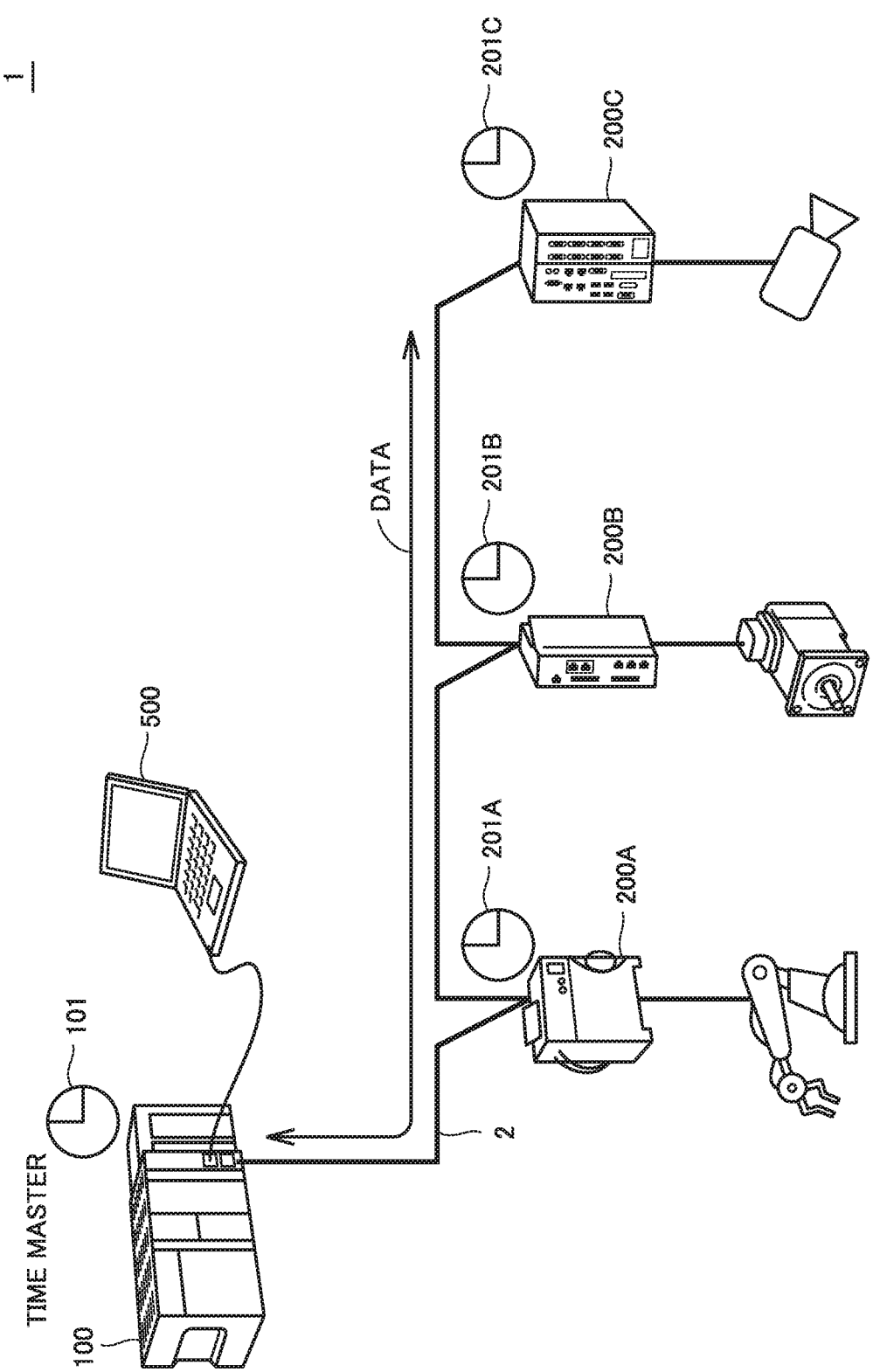
FIG. 1 is a view schematically illustrating a configuration of a communication system according to an embodiment.

Hereinafter, an embodiment of the present invention will be described with reference to the drawings. In the following description, the same components and constituents are denoted by the same reference numerals. Names and functions of the same components and constituents are the same. Thus, detailed description thereof will not be repeated. The embodiment and each modification described below may appropriately selectively be combined.

A. APPLICATION EXAMPLE

With reference to FIG. 1, an example of a scene to which the present invention is applied will be described. FIG. 1 is a view schematically illustrating a configuration of a communication system 1 according to an embodiment.

Communication system 1 of the embodiment is a communication system in which a plurality of communication devices (control device 100, devices 200A to 200C) are connected to a network 2.

The plurality of communication devices include a time master and a plurality of time slaves. The time master and each of the plurality of time slaves include time-synchronized timers. The time master includes the timer functioning as a "master clock" that manages the time of communication system 1, and time-synchronizes the timer functioning as a "slave clock" included in the time slave connected to the network according to a synchronization procedure in a time synchronization protocol.

In the example of FIG. 1, control device 100 functions as the time master, and devices 200A to 200C function as the time slave. Control device 100 transmits and receives data to and from devices 200A to 200C through network 2. Control device 100 manages data transmission in the network. Devices 200A to 200C perform data transmission according to an instruction from control device 100.

The network of communication system 1 of the embodiment includes control device 100 that controls a manufacturing device, a production facility, and the like, and is configured to satisfy requirements conforming to what is called an industrial network or an industrial network. One of the requirements is to guarantee the time the data sent from a source arrives at a destination.

Communication system 1 in which the plurality of communication devices time-synchronized with each other are connected to the network is used in order to guarantee the arrival time at the destination. That is, transmission and reception timing is time-synchronized among the plurality of communication devices constituting the network of communication system 1. More specifically, each of the plurality of communication devices constituting the network includes the time-synchronized timer (or a counter that is synchronously incremented or decremented), and each communication device determines the data transmission or reception timing according to the time-synchronized timer or counter.

In the example of FIG. 1, control device 100 includes a timer 101, and devices 200A to 200C include timers 201A to 201C, respectively. For example, timer 101 of control device 100 functions as the "master clock", and the timers of devices 200A to 200C synchronize timing based on the master clock. The synchronization between the timers enables data transmission timings to be matched with each other in communication system 1.

In communication system 1 of the embodiment, a time synchronization function is mounted on each time slave in order to implement the time synchronization between the time master and the plurality of time slaves. As the time synchronization function, each time slave has a function of correcting the timer of the own device based on the timer of the communication device connected adjacent to a master side on the network.

Specifically, in communication system 1 of FIG. 1, device 200A corrects the time of timer 201A (slave clock) of the own device based on timer 101 (master clock) of control device 100 in order to perform the time synchronization with control device 100 connected adjacent to the master side. Specifically, device 200A periodically performs time synchronization processing of exchanging a time synchronization packet with control device 100, and calculates a difference between timer 101 and timer 201A of the own device based on information obtained through the process. Device 200A corrects timer 201A of the own device using the difference as a time adjustment value.

Device 200B periodically performs the time synchronization processing with device 200A connected adjacent to the master side. Device 200B calculates a difference between timer 201A of device 200A and timer 201B of the own device, and corrects timer 201B of the own device using the difference as the time adjustment value.

Device 200C periodically performs the time synchronization processing with device 200B connected adjacent to the master side. Device 200C calculates a difference between timer 201B of device 200B and timer 201C of the own device, and corrects timer 201C of the own device using the difference as the time adjustment value.

As described above, in communication system 1, the two communication devices connected adjacent to each other perform the time synchronization processing in a relationship between the master and the slave, which allows each of the timers (slave clocks) of devices 200A to 200C to be finally time-synchronized with timer 101 (master clock) of control device 100.

However, a sequence notifying the time master of time synchronization accuracy of each time slave does not exist in the time synchronization processing, so that the time master cannot determine whether the time synchronization is completed in the plurality of time slaves. For this reason, after communication system 1 is powered on, the time master cannot determine the timing at which the data transmission with the plurality of time slaves can be started.

For example, a configuration in which time sufficiently longer than the time actually spent for the time synchronization processing is set and the data transmission is started after the set time elapses after the power-on can be adopted in order to solve the problem. With this configuration, it is guaranteed that the data transmission is performed while the time synchronization is completed. However, there is a risk that it takes a time more than necessary until the data transmission is started since the power-on.

A sequence in which the time master monitors the time synchronization accuracy of the time slave during the performance of the data transmission does not exist in the time synchronization processing. For this reason, when a time lag is generated between the master clock of the time master and the slave clock of the time slave, the time lag cannot be detected.

In communication system 1 of the embodiment, each of the plurality of time slaves includes a "communication unit"

that notifies the time master of time synchronization information indicating the time synchronization accuracy of the slave clock of the own device. Consequently, in the configuration example of FIG. 1, control device 100 that is the time master is notified of the time synchronization information from each of devices 200A to 200C. Thus, control device 100 can determine whether the time synchronization between the own device and each device is completed based on the time synchronization information of which devices 200A to 200C notify control device 100. As a result, the data transmission can be started in timing of completing the time synchronization in entire communication system 1. Thus, the data transmission can more quickly be started as compared with a configuration in which the data transmission is started in timing at which the set time elapses after the power-on.

During the performance of the data transmission, control device 100 can monitor the time synchronization accuracy of each of devices 200A to 200C based on the time synchronization information of which devices 200A to 200C notify control device 100, so that the data transmission can immediately be stopped when the time lag with any one of the devices is generated. This enables avoidance of a possibility that the timing at which the device acquires input data and the timing at which the device outputs output data vary depending on the generation of the time lag.

B. ENTIRE CONFIGURATION EXAMPLE OF COMMUNICATION SYSTEM

An entire configuration of communication system 1 of the embodiment will be described. FIG. 1 is a view schematically illustrating a configuration of a communication system 1 according to an embodiment.

In the configuration example of FIG. 1, control device 100 and the plurality of devices 200A to 200C (hereinafter, sometimes collectively referred to as a "device 200") are connected to network 2. For example, devices 200A to 200C are sequentially connected by a daisy chain. In FIG. 1, a connection form between device 200 and control device 100 in network 2 has a line type, but is not limited to the line type. For example, other connection forms including a ring type, a bus type or a star type may be adopted.

In the network of communication system 1, both control device 100 and devices 200A to 200C can be regarded as a "communication device having a data transfer function". In the example of FIG. 1, control device 100 and devices 200A to 200C each have the following function. That is, when the device receives data transferred on the network (hereinafter, data in one transfer unit is also referred to as a "frame") from another adjacently-connected communication device, the device transfers as necessary the incoming frame to still another adjacently-connected communication device. When the received frame is addressed to the own device, the received frame is processed by the device that receives the frame without transferring the received frame to another communication device.

Control device 100 corresponds to an industrial controller that controls control targets such as various kinds of facilities and devices included in a manufacturing device or a production line (hereinafter, also referred to as a "field"). Hereinafter, control device 100 is also referred to as a "control master". Control device 100 is a kind of computer that performs a control operation, and may typically be embodied as a PLC (programmable logic controller).

The control targets such as a sensor and an actuator can directly be connected to control device 100, or can be connected to control device 100 through network 2. In the embodiment, as illustrated in FIG. 1, the control targets can be connected to control device 100 through device 200 and network 2.

Each of devices 200 includes an input device that acquires a field signal, and an output device or an actuator that performs some sort of action on the field according to an instruction from control device 100. Device 200 corresponds to one example of a "control slave" controlled by the control master. Network 2 provides input and device control as a main function. Network 2 corresponds to a "field network" in a narrow sense. In general, the "field network" is also referred to as a "field bus". In the following description, for convenience, network 2 is a concept that can include both the "field network" and the "field bus".

The control operation performed in control device 100 includes processing of collecting data (hereinafter, also referred to as "input data") collected or generated by device 200 (input processing), processing of generating data (hereinafter, also referred to as "output data") such as an instruction to device 200 (operation processing), and processing of transmitting the generated output data to target device 200 (output processing).

A support device 500 can be connected to control device 100. Support device 500 is a device that supports a preparation necessary for control device 100 to manage network 2 and a preparation necessary for the control of the control target. For example, support device 500 provides a setting environment where a parameter (configuration) of device 200 connected to control device 100 is set in connection with the management of network 2. Support device 500 can include a PC (personal computer) on which a setting tool providing the setting environment and the like are installed.

In communication system 1 of FIG. 1, support device 500 is provided separately from control device 100. Alternatively, support device 500 may be provided integrally with control device 100. That is, the functions of support device 500 can be built in control device 100.

Any device 200 can be connected to network 2. Device 200 includes an actuator that gives some physical action to the field and an input and output device that exchanges information with the field.

The data is exchanged between control device 100 and device 200 through network 2, and the exchanged data is updated in a very short cycle of the order of several hundred microseconds to several tens milliseconds.

C. TRANSMITTED DATA AND COMMUNICATION PERFORMANCE

In network 2 of FIG. 1, basically data (hereinafter, sometimes collectively referred to as "control-system data") used to control a manufacturing device or a production facility is periodically transmitted. In network 2, other data different from control-system data can also be transmitted. For example, other data include data referred to as "information-system data" or "control information-system data". These data are data that does not require a high-speed real-time property unlike the control-system data, but requires a certain degree of punctuality.

A servo instruction value, an encoder value, and on and off values of a sensor can be cited as an example of the control-system data. Because the control-system data is used to control a manufacturing device or a production facility, the control-system data is transmitted from control device 100 at a constant communication cycle. In communication system 1, it is necessary to certainly guarantee the communication cycle.

Preferably a bus or a network that performs constant cycle communication guaranteeing the data arrival time is used as network 2 of the embodiment. A network according to known protocols such as EtherCAT (registered trademark) that is an example of a machine control network and EtherNet/IP (registered trademark) that is an industrial open network in which a control protocol is mounted on general-purpose Ethernet (registered trademark) may be used.

D. HARDWARE CONFIGURATION

Figure 2:
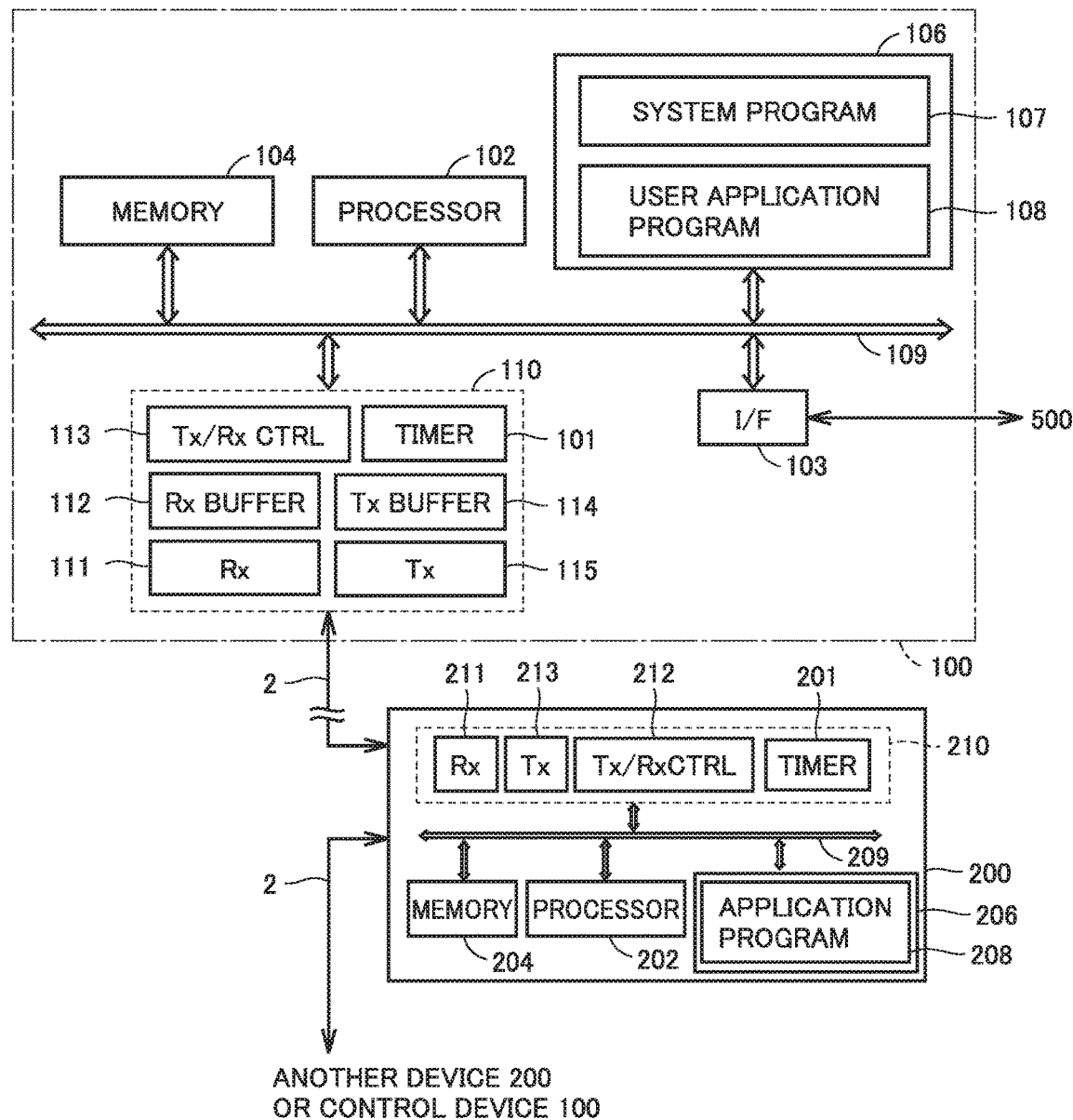
FIG. 2 is a schematic diagram illustrating an example of a hardware configuration in the communication system of the embodiment.

FIG. 2 is a schematic diagram illustrating an example of a hardware configuration in communication system 1 of the embodiment. Control device 100 may typically be formed based on a PLC.

With reference to FIG. 2, control device 100 includes a processor 102, a memory 104, a storage 106, and a network controller 110 as main components. Control device 100 further includes an I/F (Interface) that communicates with support device 500.

A system program 107 controlling each unit of control device 100 and a user application program 108 designed according to the control target are stored in storage 106. Processor 102 reads system program 107 and user application program 108 stored in storage 106 to memory 104, and executes system program 107 and user application program 108, thereby performing various pieces of processing including processing to be described later. Memory 104 is formed of a volatile storage device such as a DRAM (Dynamic Random Access Memory) and an SRAM (Static Random Access Memory).

Network controller 110 provides an interface that is used by control device 100 in order to exchange the data with each device 200 through network 2. Network controller 110 includes a reception circuit (Rx) 111, a reception buffer 112, a transmission and reception controller 113, a transmission buffer 114, a transmission circuit (Tx) 115, and timer 101 as main components.

Reception circuit 111 receives the frame transmitted on network controller 110 in the constant cycle, and writes the data stored in the received frame in reception buffer 112. Transmission and reception controller 113 sequentially reads the received frame written in reception buffer 112. Transmission and reception controller 113 extracts only the data necessary for the processing in control device 100 from the read frame, and outputs the data to processor 102. Transmission and reception controller 113 sequentially writes the data or frame to be transmitted to device 200 to transmission buffer 114 according to an instruction from processor 102. Transmission circuit 115 sequentially transmits the data stored in transmission buffer 114 to network 2 in synchronization with the cycle at which the frame is transmitted on network controller 110. Timer 101 can also be a grand master that generates a pulse used as a reference of timing of instructing the transmission of a communication frame from transmission and reception controller 113.

With reference to FIG. 2, device 200 implements various functions necessary for the performance of the control of various facilities and devices by communication system 1. Typically, each of devices 200 manages the collection of field information from the facility or device of the control target and the output of an instruction signal to the facility or device of the control target. Each of devices 200 includes a processor 202, a memory 204, a storage 206, and a communication circuit 210 as main components. Communication circuit 210 processes the frame transmitted through network 2. That is, when receiving some frame through network 2, communication circuit 210 writes and reads the data in and from the received frame, and transfers the frame to device 200 located next on network 2.

More specifically, communication circuit 210 includes a reception circuit (Rx) 211, a transmission and reception controller 212, a transmission circuit (Tx) 213, and a timer 201. Reception circuit 211 and transmission circuit 213 are a part physically connected to network 2, receive the frame transmitted on network 2 according to an instruction from transmission and reception controller 212, process the received frame, and transmit the processed frame to network 2. Transmission and reception controller 212 writes and reads the data in and from the frame transmitted on network 2. Timer 201 generates a clock used as a reference for timing of instruction output by transmission and reception controller 212 or timing of the performance of the processing by device 200. Consequently, the plurality of communication devices including control device 100 and each device 200 can be time-synchronized with each other.

E. TIME SYNCHRONIZATION FUNCTION

In communication system 1 of FIG. 1, control device 100 includes timer 101, and devices 200A to 200D include timers 201A to 201C, respectively. Timer 101 of control device 100 functions as the master clock, and the timers of devices 200A to 200C synchronize the timing based on the master clock, so that the data transmission timings can be matched with each other in communication system 1.

A high-accuracy time synchronization protocol such as IEEE1588, IEEE802.1AS, and IEEE802.1AS-Rev can be adopted as the time synchronization between the communication devices in communication system 1.

For example, a PTP (Precision Time Protocol) is defined in IEEE1588 as the high-precision time synchronization protocol. The PTP can be applied to the communication system including a time master M including the master clock and a time slave S including the slave clock. In the PTP, a time synchronization packet is periodically exchanged between time master M and time slave S, and the time of the slave clock of time slave S is corrected based on information obtained through the process.

Figure 3:
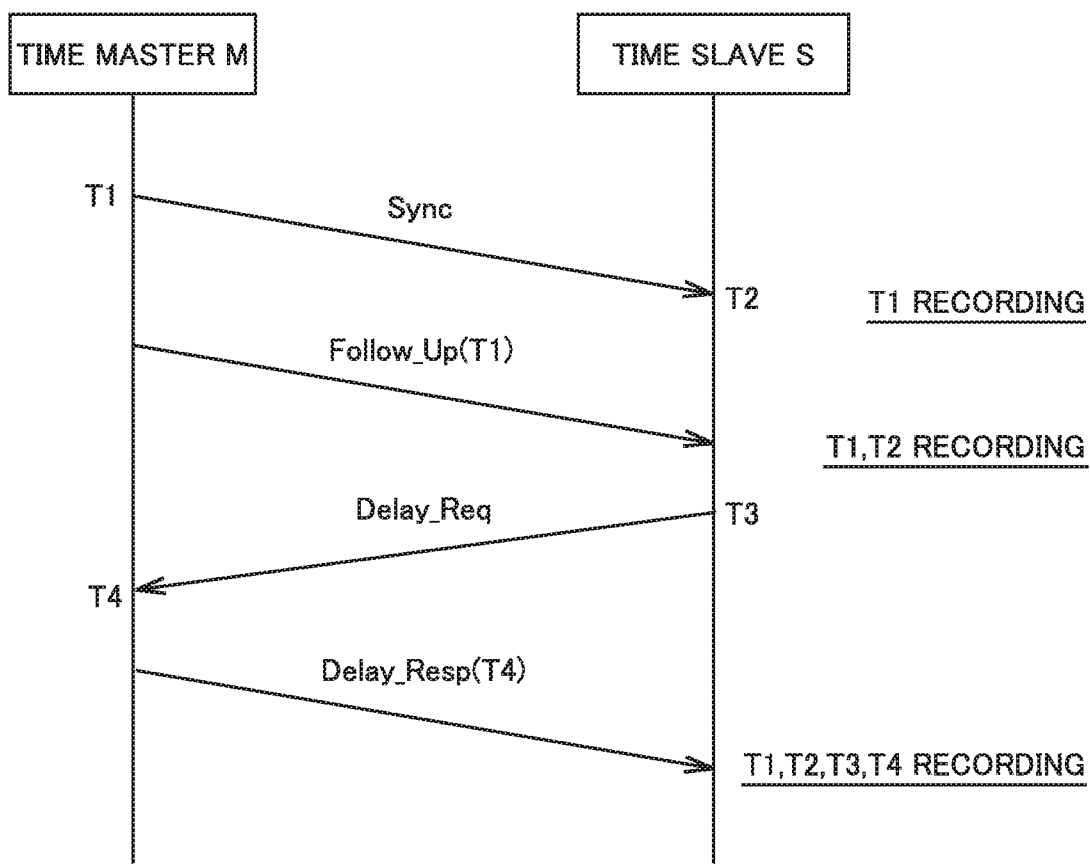
FIG. 3 is a sequence diagram illustrating an example of PTP time synchronization processing.

FIG. 3 is a sequence diagram illustrating an example of PTP time synchronization processing. In the sequence diagram of FIG. 3, the time synchronization between the master clock and the slave clock is implemented by linking time master M and time slave S together.

In FIG. 3, OFFSET that is a difference between time $T_M$ of the master clock of time master M and time $T_S$ of the slave clock of time slave S is generally given by the following equation (1).

$$\text{OFFSET} = T_S - T_M \quad (1)$$

Time master M transmits a time synchronization packet (Sync message) to time slave S. A relationship of the following equation (2) holds among time T1 time master M transmits the Sync message, time T2 time slave S receives the Sync message, and a delay time $D_{M/S}$ in a direction from time master M toward time slave S.

$$T2 = T1 + \text{OFFSET} + D_{M/S} \quad (2)$$

Subsequently, time master M transmits a time synchronization packet (Follow_Up message) to time slave S. The Follow_Up message includes information indicating time T1 time master M transmits the Sync message. Time slave S records time T1 and time T2.

Subsequently, time slave S transmits a time synchronization packet (Delay_Req message) to time master M. When receiving the Delay_Req message, time master M transmits a time synchronization packet (Delay_Resp message) to time slave S. The Delay_Resp message includes information indicating time T4 the Delay_Req message is received. When time slave S receives the Delay_Resp message, because time slave S can confirm that time master M has received the Delay_Req message, time slave S records time T3 and time T4.

A relationship of the following equation (3) holds among time T3 time slave S transmits the Delay_Req message, time T4 time master M receives the Delay_Req message, and delay time $D_{S/M}$ in a direction from time slave S toward time master M.

$$T4 = T3 - \text{OFFSET} + D_{S/M} \quad (3)$$

Time slave S records times T1, T2, T3, T4 (that is, four time stamps). At this point, assuming that bidirectional delay times $D_{M/S}$, $D_{S/M}$ are equal to each other ($D_{M/S} = D_{S/M}$), time slave S can calculate OFFSET using the following equation (4) based on the equations (2), (3).

$$\text{OFFSET} = \{(T2-T4)-(T1-T3)\}/2 \quad (4)$$

The PTP time synchronization processing holds when the bidirectional delay times are equal to each other, but an error is generated in the case of the different bidirectional delay times because of a switch or the like provided in the middle. In IEEE1588, a delay management function called a transparent clock is further defined in order to solve the error generated by the difference between the bidirectional delay times.

The transparent clock includes an E2E (End to End) transparent clock and a P2P (Peer to Peer) transparent clock. The E2E transparent clock is a method, in which a time stamping function is installed at an input unit and an output unit of each switch disposed between time master M and time slave S and a packet passing time of each switch is measured to perform correction. In the E2E transparent clock, a delay time is measured between time master M and time slave S using a Delay request-Delay response mechanism illustrated in FIG. 3.

Figure 4:
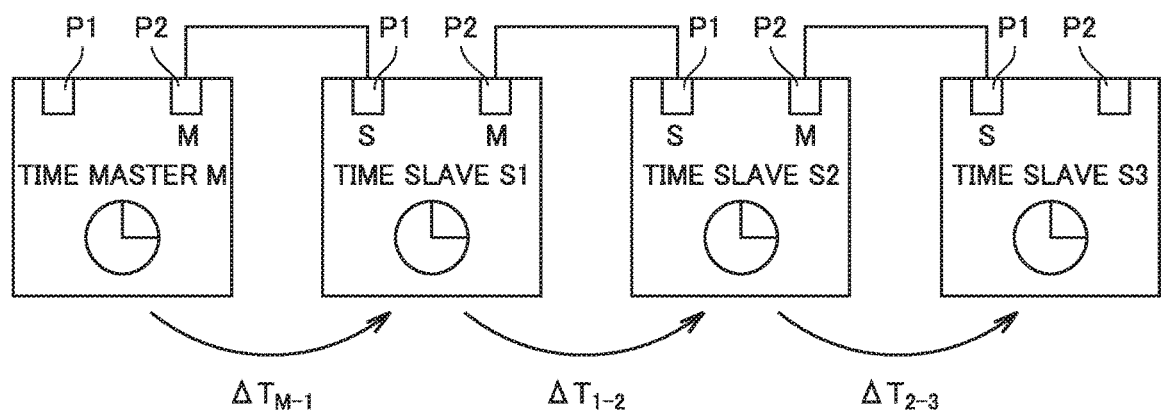
FIG. 4 is a conceptual diagram illustrating an example of the time synchronization processing using a P2P transparent clock.

On the other hand, the P2P transparent clock is a method in which two adjacent communication devices have a relationship of the master and the slave to set the timers as illustrated in FIG. 4. In the P2P transparent clock, the delay time is measured between the peers using a Peer delay mechanism. In the example of FIG. 4, time master M and time slaves S1 to S3 are sequentially connected in the daisy chain. In communication system 1 of FIG. 1, control device 100 corresponds to time master M, and devices 200A to 200C correspond to time slaves S1 to S3, respectively.

Time master M and time slaves S1 to S3 each include ports P1, P2. Each of ports P1, P2 can be designated to a master port or a slave port.

Figure 24:
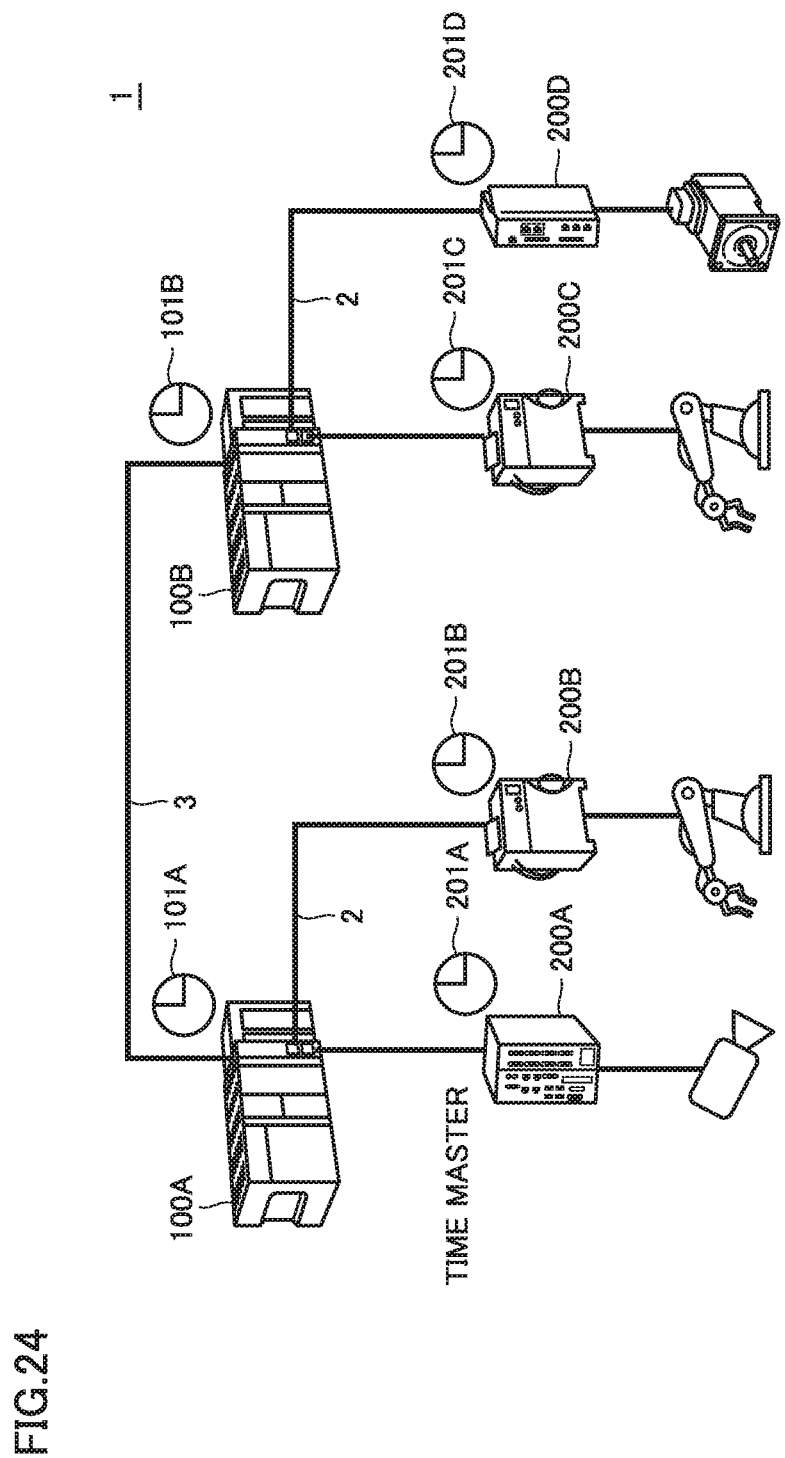
FIG. 24 is a view schematically illustrating a first configuration example of a communication system to which the communication unit in FIG. 23 is applied.

However, when control device 100 functions as time master M, sometimes one of ports P1, P2 in time master M is designated to the master port, and the other port is connected to a higher-order network or another control device on the same network (see FIG. 24). Alternatively, when the connection form of time master M and time slaves S1 to S3 is a ring type, both ports P1, P2 of time master M are assigned the master port.

A user can assign which one of the timers of the plurality of communication devices constituting communication system 1 functions as the master clock. Alternatively, the timer of the communication device can automatically be specified using a master clock selection algorithm. Ports P1, P2 of time slaves S1 to S3 can be assigned by the user. Alternatively, ports P1, P2 of time slaves S1 to S3 can automatically be assigned based on topology information about communication system 1 designed by a tool.

In communication system 1 of the embodiment, the time synchronization processing is performed using the P2P transparent clock, thereby synchronizing the slave clock of each of time slaves S1 to S3 with the master clock of time master M.

Figure 5:
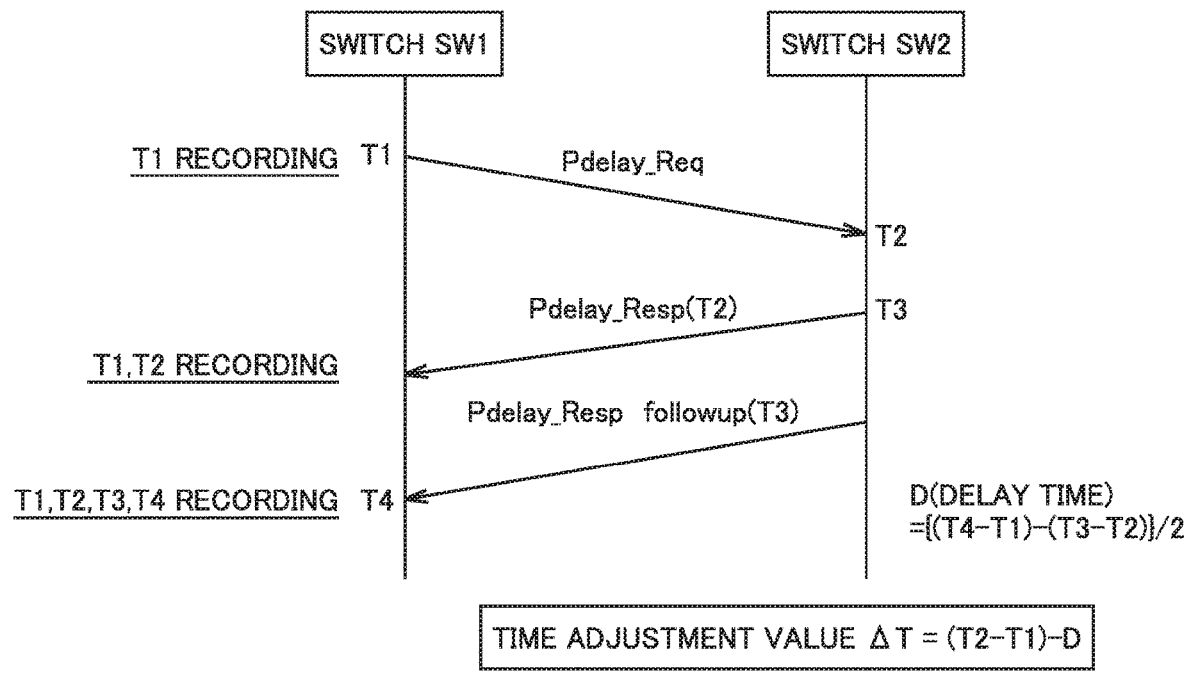
FIG. 5 is a sequence diagram illustrating an example of the time synchronization processing using the P2P transparent clock.

FIG. 5 is a sequence diagram illustrating an example of the time synchronization processing using the P2P transparent clock. In the sequence diagram of FIG. 5, switches SW1, SW2 are a network switch having a P2P transparent clock function. Switches SW1, SW2 are connected adjacent to each other on the network. In FIG. 5, it is assumed that switch SW2 is located adjacent to the master side of switch SW1. The time synchronization packet is periodically exchanged between switches SW1, SW2, and the time of the clock of switch SW1 is corrected based on information obtained through the process.

In FIG. 5, assuming that $\Delta T$ is a difference between time $T_{S1}$ of the clock of switch SW1 and time $T_{S2}$ of the clock of switch SW2, $\Delta T$ is given by the following equation (5).

$$\Delta T = T_{S2} - T_{S1} \quad (5)$$

Switch SW1 transmits a time synchronization packet (Pdelay_Req message) to switch SW2. A relationship of the following equation (6) holds among time T1 switch SW1 transmits the Pdelay_Req message, time T2 switch SW2 receives the Pdelay_Req message, and a delay time $D_{1/2}$ in the direction from switch SW1 toward switch SW2.

$$T2 = T1 + \Delta T + D_{1/2} \quad (6)$$

Subsequently, switch SW2 transmits a time synchronization packet (Pdelay_Resp message) to switch SW1. The Pdelay_Resp message includes information indicating time T2 switch SW2 receives the Pdelay_Req message. Switch SW1 records time T1 and time T2.

Subsequently, switch SW2 transmits a time synchronization packet (Pdelay_Resp_followup message) to switch SW1. The Pdelay_Resp_followup message includes information indicating time T3 switch SW2 transmits the Pdelay_Resp message. Switch SW1 records time T3 the Pdelay_Resp_followup message is transmitted and time T4 the Pdelay_Resp_followup message is received.

A relationship of the following equation (7) holds among time T3 switch SW2 transmits the Pdelay_Resp_followup message, time T4 switch SW1 receives the Pdelay_Resp_followup message, and a delay time $D_{2/1}$ in the direction from switch SW2 toward switch SW1.

$$T4 = T3 - \Delta T + D_{2/1} \quad (7)$$

Switch SW1 records times T1, T2, T3, T4 (that is, four time stamps). At this point, assuming that bidirectional delay times $D_{1/2}$ and $D_{2/1}$ are equal to each other ($D_{1/2} = D_{2/1}$), delay time D can be calculated by the following equation (8).

$$D = \{(T4-T1)-(T3-T2)\}/2 \quad (8)$$

Based on the equations (6) and (8), difference $\Delta T$ between the time of the clock of switch SW1 and the time of the clock of switch SW can be calculated by the following equation (9). Switch SW1 corrects the time of the clock of the own device using difference $\Delta T$ as the time adjustment value.

$$\Delta T = (T2-T1) - \{(T4-T1)-(T3-T2)\}/2 \quad (9)$$

With reference to FIG. 4 again, time slave S1 performs the time synchronization processing in FIG. 5 with time master M connected to the slave port, thereby calculating difference ΔT between the time of the clock (master clock) of the time master M and the time of the clock (slave clock) of the own device. In this case, in the sequence diagram of FIG. 5, time slave S1 corresponds to switch SW1, and time master M corresponds to switch SW2. In the following description, difference ΔT of the time of time slave S1 to the time of time master M is represented as "$\Delta T_{M-1}$". Time slave S1 corrects the time of the timer of the own device using difference $\Delta T_{M-1}$ as the time adjustment value.

Time slave S2 performs the time synchronization processing in FIG. 5 with time slave S1 connected to the slave port, whereby time slave S1 calculates time difference ΔT. Time slave S2 corresponds to switch SW1 in FIG. 4, and calculates difference ΔT between the time of the clock of time slave S1 and the time of the clock of the own device. In this case, in the sequence diagram of FIG. 5, time slave S2 corresponds to switch SW1, and time slave S1 corresponds to switch SW2. In the following description, difference ΔT of the time of time slave S2 to the time of time slave S1 is represented as "$\Delta T_{1-2}$". Time slave S2 corrects the time of the clock of the own device using difference $\Delta T_{1-2}$ as the time adjustment value.

Time slave S3 performs the time synchronization processing in FIG. 5 with time slave S2 connected to the slave port, thereby calculating difference ΔT between the time of the clock of time slave S2 and the time of the clock of the own device. In this case, in the sequence diagram of FIG. 5, time slave S3 corresponds to switch SW1, and time slave S2 corresponds to switch SW2. In the following description, difference ΔT of the time of time slave S3 to the time of time slave S2 is represented as "$\Delta T_{2-3}$". Time slave S3 corrects the time of the clock of the own device using difference $\Delta T_{2-3}$ as a time adjustment value.

In this way, each of the plurality of communication devices corrects the time of the clock of the own device using difference ΔT between the time of the clock of the communication device connected adjacent to the master side and the time of the clock of the own device as the time adjustment value, whereby the time synchronization is finally implemented between time master M and all time slaves S1 to S3. When the time synchronization of entire communication system 1 is completed, the transmission of the control-system data can be started between the plurality of communication devices.

However, the sequence notifying time master M of the time synchronization accuracy of each time slave S does not exist in the time synchronization processing of FIG. 5. For this reason, time master M cannot determine whether the time synchronization of each time slave S is completed, and cannot determine the timing of starting the transmission of the control-system data after the power-on of communication system 1.

For example, a configuration in which the time sufficiently longer than the time actually spent for the time synchronization processing is set and the transmission of the control-system data is started at the time the set time elapses after the power-on of communication system 1 is adopted in order to solve the problem. With this configuration, it is guaranteed that the transmission of the control-system data is performed while the time synchronization is completed. However, there is a concern that it takes a time more than necessary until the transmission of the control-system data is started since the power-on.

A sequence in which time master M monitors the slave clock of time slave S during the performance of the data transmission does not exist. For this reason, when the time lag is generated between the master clock of time master M and the slave clock of time slave S, the time lag cannot be detected.

At this point, PTL 1 discloses a technique in which time slave S contains information indicating time T3 the Delay-_Req message is transmitted in the time synchronization packet (Delay_Req message) transmitted to time master M in the time synchronization processing in which E2E transparent clock in FIG. 3 is used. In the technique of PTL 1, time master M can determine whether the time synchronization of time slave S is completed based on whether a monitoring time difference (T4−T3) that is a difference between time T3 and time T4 falls within a predetermined allowable range.

When the technique of PTL 1 is applied to the time synchronization processing in which the P2P transparent clock in FIG. 5 is used, time master M receives the time synchronization packet including the time information from nearest time slave S1, which allows time master M to determine whether the time synchronization of time slave S1 is completed. However, because the time synchronization packet is not exchanged between time master M and time slaves S2, S3, time master M cannot determine whether the time synchronization of each of time slaves S2, S3 is completed.

In communication system 1 of the embodiment, time slave S includes the "communication unit" that notifies time master M of the information (time synchronization information) indicating the time synchronization accuracy of the slave clock of the own device. With this configuration, time master M can determine whether the time synchronization of time slaves S1 to S3 is completed based on the time synchronization information of which each of time slaves S1 to S3 notifies time master M.

F. COMMUNICATION UNIT

A configuration example of the communication unit included in time slave S in communication system 1 of the embodiment will be described below.

(f1. Configuration Example 1 of Communication Unit)

Figure 6:
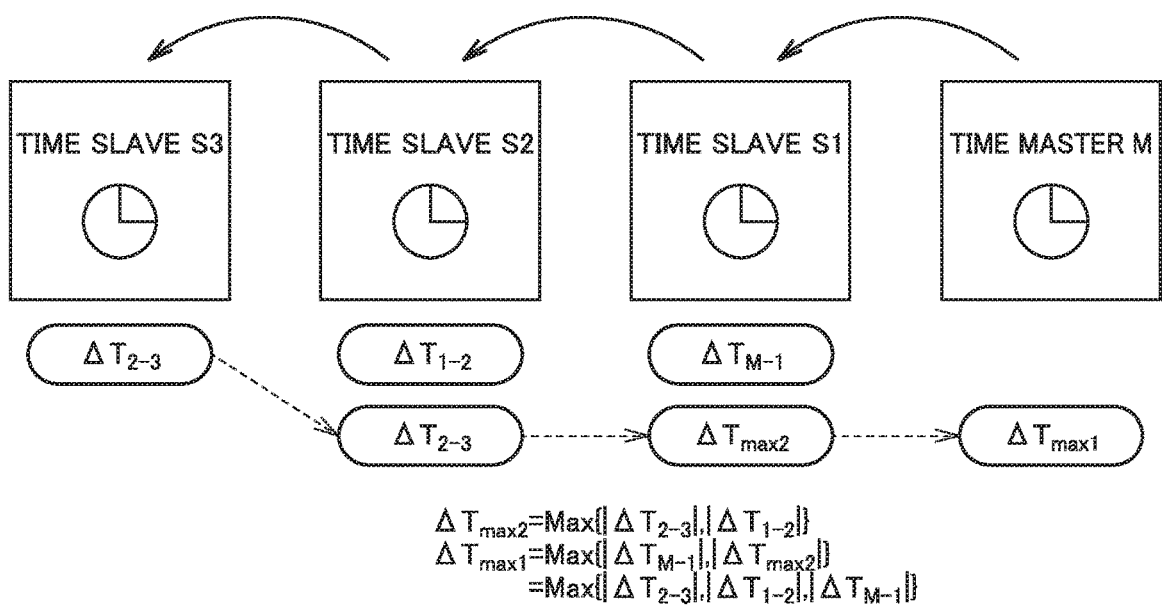
FIG. 6 is a view schematically illustrating a configuration example 1 of a communication unit of the embodiment.

FIG. 6 is a view schematically illustrating a configuration example 1 of the communication unit of the embodiment. The communication unit of the embodiment is configured to make a notification of a time adjustment value ΔT used for the time correction of the slave clock of the own device as the time synchronization information.

With reference to FIG. 6, time slave S3 performs the time synchronization processing (see FIG. 5) with time slave S2, thereby calculating a difference $\Delta T_{2-3}$ of the time of time slave S3 to the time of time slave S2. Time slave S3 notifies time slave S2 of calculated time adjustment value $\Delta T_{2-3}$.

Time slave S2 performs the time synchronization processing with time slave S1, thereby calculating a difference $\Delta T_{1-2}$ of the time of time slave S2 to the time of time slave S1. Time slave S2 compares time adjustment value $\Delta T_{2-3}$ received from time slave S3 to calculated time adjustment value $\Delta T_{1-2}$. Specifically, time slave S2 compares an absolute value $|\Delta T_{2-3}|$ of time adjustment value $\Delta T_{2-3}$ to an absolute value $|\Delta T_{1-2}|$ of time adjustment value $\Delta T_{1-2}$, and selects the greater absolute value (hereinafter, also referred to as a "maximum time adjustment value ΔTmax"). Assuming that ΔTmax2 is a maximum time adjustment value in time slave S2, maximum time adjustment value ΔTmax2 is given by the following equation (10). Time slave S2 notifies time slave S1 of maximum time adjustment value ΔTmax2.

$$\Delta T\max2=\text{Max}\{|\Delta T_{2-3}|, |\Delta T_{1-2}|\} \qquad (10)$$

Time slave S1 performs the time synchronization processing with time master M, thereby calculating difference $\Delta T_{M-1}$ of the time of time slave S1 to the time of time master M. Time slave S1 compares maximum time adjustment value ΔTmax2 received from time slave S2 to an absolute value $|\Delta T_{M-1}|$ of time adjustment value $\Delta T_{M-1}$, and selects the greater absolute value (maximum time adjustment value ΔTmax). Assuming that ΔTmax1 is a maximum time adjustment value ΔTmax1 in time slave S1, maximum time adjustment value ΔTmax1 is given by the following equation (11). Time slave S1 notifies time master M of maximum time adjustment value ΔTmax1.

$$\Delta T\max1=\text{Max}\{|\Delta T_{M-1}|, \Delta T\max2\} \qquad (11)$$

At this point, according to the equations (10), (11), maximum time adjustment value ΔTmax1 can be given by the following equation (12).

$$\Delta T\max1=\text{Max}\{|\Delta T_{2-3}|, |\Delta T_{1-2}|, |\Delta T_{M-1}|\} \qquad (12)$$

As can be seen from the equation (12), time master M is notified of the greatest one in the absolute values of time adjustment values $\Delta T_{2-3}$, $\Delta T_{1-2}$, and $\Delta T_{M-1}$ of time slaves S1 to S3 as the maximum time adjustment value ΔTmax1.

Time master M determines whether the time synchronization of time slaves S1 to S3 is completed based on maximum time adjustment value ΔTmax1. Specifically, time master M sets a threshold used for determining whether the time synchronization is completed to a value obtained by dividing predetermined allowable time accuracy in communication system 1 by the maximum number of paths. As used herein, the maximum number of paths is equivalent to the total number of transmission paths existing between time master M and terminal time slave S (corresponding to time slave S3 in the example of FIG. 6). In the example of FIG. 6, the maximum number of paths is 3. Thus, the threshold is set to one-third the allowable time accuracy. For example, when the allowable time accuracy is set to 1 μs, the threshold is set to 0.333 μs.

In the example of FIG. 6, a time difference in which differences ΔT of time slaves S are added is generated between time master M and terminal time slave S3. For this reason, even when each time slave S has time difference ΔT from another adjacently-connected communication device less than the allowable time accuracy, there is a possibility of generating the time difference exceeding the allowable time accuracy between time master M and terminal time slave S3. Accordingly, the threshold used for determining the completion of the time synchronization is set to a value obtained by dividing the allowable time accuracy by the maximum number of paths, and that the time difference between time master M and time slave S3 is less than the allowable time accuracy is set to a determination condition for the completion of the time synchronization.

Time master M compares maximum time adjustment value ΔTmax1 to the threshold, and determines that the time synchronization of time slaves S1 to S3 is completed when maximum time adjustment value ΔTmax1 is less than the threshold. When determining that the time synchronization is completed, time master M starts the transmission of control-system data with time slaves S1 to S3. On the other hand, when maximum time adjustment value ΔTmax1 is greater than the threshold, time master M determines that the time synchronization of time slaves S1 to S3 is not completed, and does not start the transmission of the control-system data.

In communication system 1, because the time synchronization processing is periodically performed, time master M is also notified of the time synchronization information of each time slave S. Thus, time master M can monitor the time synchronization accuracy of time slaves S1 to S3 during the performance of the data transmission. When maximum time adjustment value ΔTmax1 of which time master M is notified exceeds the threshold value due to the generation of the time difference between any one of time slaves S1 to S3 and time master M, time master M determines that the time synchronization between time master M and time slaves S1 to S3 fails, and stops the transmission of the control-system data. With this configuration, in the data transmission of communication system 1 in FIG. 1, control device 100 can stably manage the transmission and reception timing of the control-system data of the plurality of devices 200A to 200C.

Figure 7:
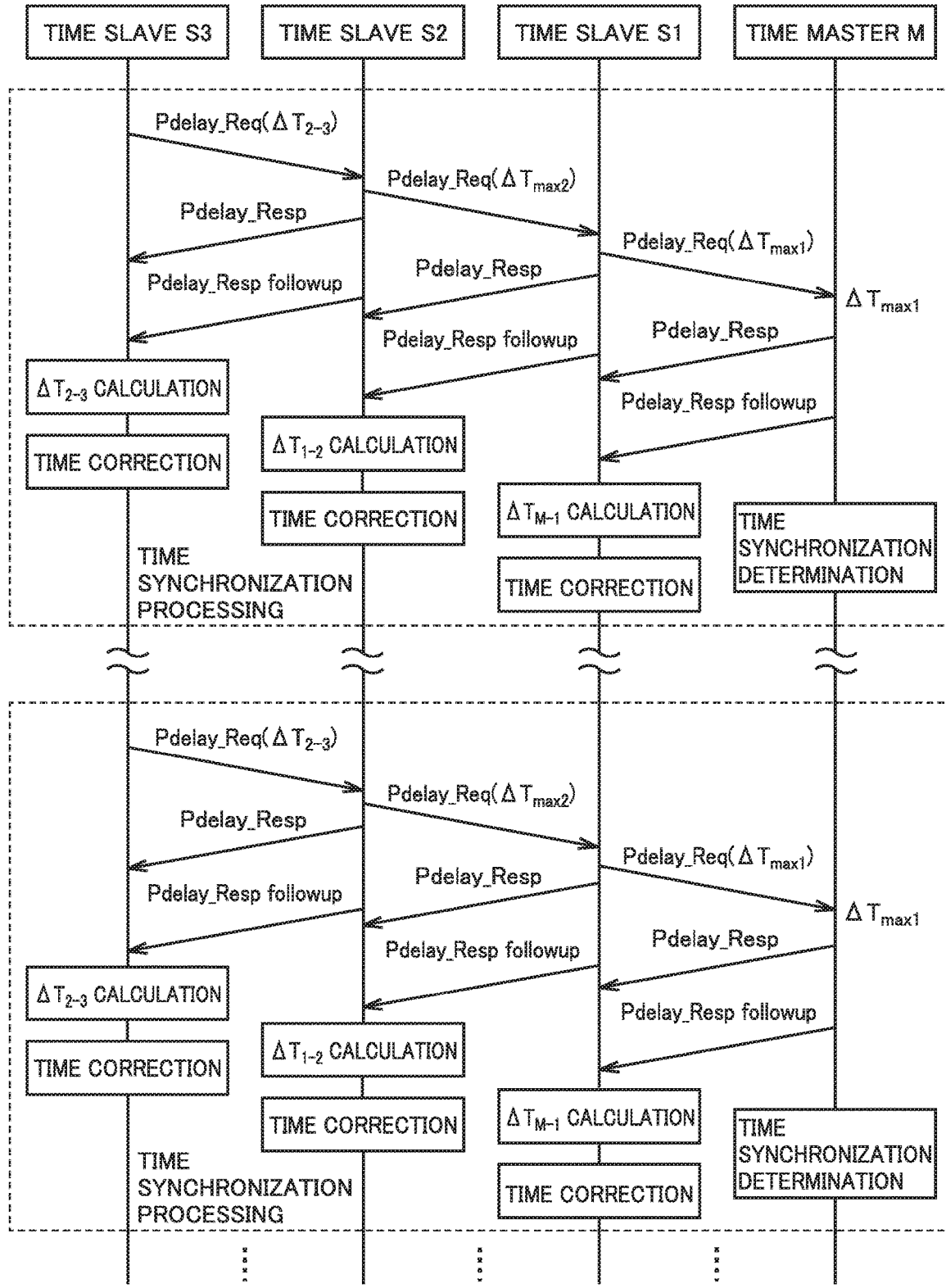
FIG. 7 is a sequence diagram illustrating the time synchronization processing including the configuration example 1 of the communication unit of the embodiment.

FIG. 7 is a sequence diagram illustrating the time synchronization processing including configuration example 1 of the communication unit of the embodiment.

With reference to FIG. 7, when the time synchronization processing is started in communication system 1, time slave S3 transmits the Pdelay_Req message to time slave S2. Time slave S3 stores time adjustment value $\Delta T_{2-3}$ calculated in the previous time synchronization processing in the Pdelay_Req message transmitted to time slave S2.

When receiving the Pdelay_Req message, time slave S2 extracts time adjustment value $\Delta T_{2-3}$ stored in the Pdelay_Req message. Time slave S2 transmits the Pdelay_Resp message and the Pdelay_Resp_followup message to time slave S3. Time slave S3 calculates time adjustment value $\Delta T_{2-3}$, and corrects the time of the slave clock of the own device using calculated time adjustment value $\Delta T_{2-3}$.

Time slave S2 calculates the maximum time adjustment value ΔTmax2 by substituting time adjustment value $\Delta T_{2-3}$ received from time slave S3 and time adjustment value $\Delta T_{1-2}$ calculated through the previous time synchronization processing for the equation (10). Time slave S2 stores calculated maximum time adjustment value ΔTmax2 in the Pdelay_Req message transmitted to time slave S1.

When receiving the Pdelay_Req message, time slave S1 extracts maximum time adjustment value ΔTmax2 stored in the Pdelay_Req message. Time slave S1 transmits the Pdelay_Resp message and the Pdelay_Resp_followup message to time slave S2. Time slave S2 calculates time adjustment value $\Delta T_{1-2}$, and corrects the time of the slave clock of the own device using calculated time adjustment value $\Delta T_{1-2}$.

Time slave S1 calculates maximum time adjustment value ΔTmax1 by substituting maximum time adjustment value ΔTmax2 received from time slave S2 and time adjustment value $\Delta T_{M-1}$ calculated through the previous time synchronization processing for the equation (11). Time slave S1 stores calculated maximum time adjustment value ΔTmax1 in the Pdelay_Req message transmitted to time master M.

When receiving the Pdelay_Req message, time master M extracts maximum time adjustment value ΔTmax1 stored in the Pdelay_Req message. Time master M transmits the Pdelay_Resp message and the Pdelay_Resp_followup message to time slave S1. Time slave S1 calculates time adjustment value $\Delta T_{M-1}$, and corrects the time of the slave clock of the own device using calculated time adjustment value $\Delta T_{M-1}$.

Time master M determines whether the time synchronization of time slaves S1 to S3 is completed based on maximum time adjustment value ΔTmax1 received from time slave S1. When maximum time adjustment value ΔTmax1 is less than the threshold (=allowable time accuracy/the maximum number of paths), time master M determines that the time synchronization of time slaves S1 to S3 is completed, and starts the transmission of the control-system data with time slaves S1 to S3.

As illustrated in FIG. 7, the time synchronization information (time adjustment value ΔT) is included in the time synchronization packet (Pdelay_Req message) transmitted to the communication device located on the master side, which allows the communication unit to be constructed using the existing time synchronization sequence. Consequently, the increase in the number of packets exchanged between the communication devices during the performance of the time synchronization processing in order to construct the communication unit can be prevented.

Figure 8:
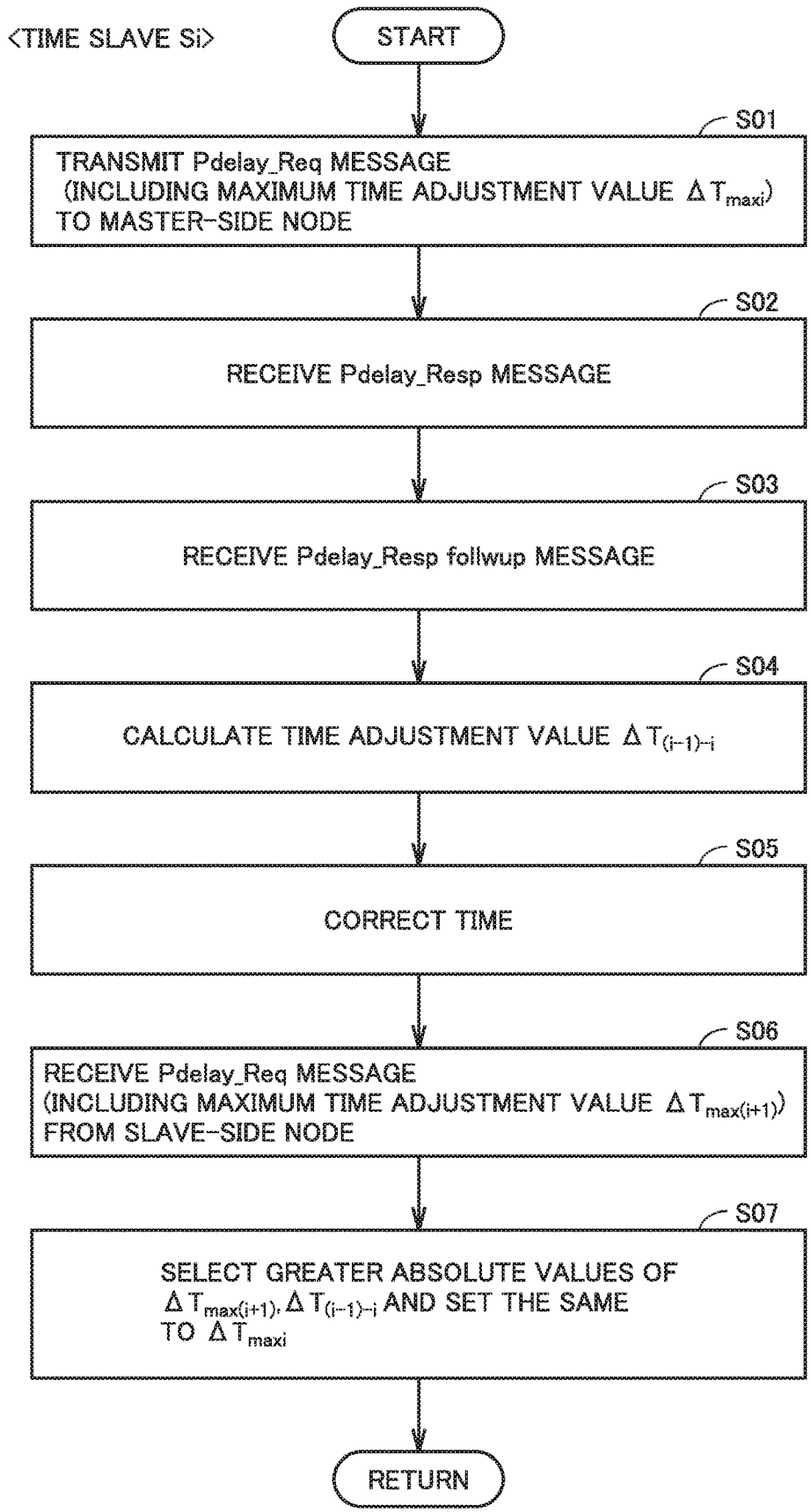
FIG. 8 is a flowchart illustrating a processing procedure by a time slave constituting the communication system of the embodiment.

FIG. 8 is a flowchart illustrating a processing procedure by time slave S constituting communication system 1 of the embodiment. FIG. 8 illustrates the processing procedure by one time slave Si (1≤i≤3) in the plurality of time slaves S1 to S3 (S3 corresponds to the terminal slave) sequentially connected to time master M. The flowchart in FIG. 8 is performed at a predetermined cycle.

With reference to FIG. 8, time slave Si transmits the time synchronization packet (Pdelay_Req message) to a master-side node (corresponding to time slave S(i−1) or time master M) (step S01). Time slave Si stores a maximum time adjustment value ΔTmaxi in the Pdelay_Req message. Time slave Si records time T1 the Pdelay_Req message is transmitted (see FIG. 6).

Subsequently, time slave Si receives the time synchronization packet (Pdelay_Resp message) from the master-side node (step S02). The Pdelay_Resp message includes time T2 the master-side node receives the Pdelay_Req message. Time slave Si records time T2.

Time slave Si further receives the time synchronization packet (Pdelay_Resp followup message) from the master-side node (step S03). The Pdelay_Resp followup message includes time T3 the master-side node transmits the Pdelay_Resp message. Time slave Si records time T3 and time T4 the Pdelay_Resp message is received.

Subsequently, time slave Si calculates difference (time adjustment value) ΔT of the time of time slave Si to the time of the master-side node based on four times T1, T2, T3, T4 (step S04). Time slave Si corrects the time of the clock of the own device using time adjustment value ΔT (step S05).

Subsequently, time slave Si receives the time synchronization packet (Pdelay_Req message) from a slave-side node (equivalent to time slave S(i+1)) (step S06). Maximum time adjustment value ΔTmax (i+1) calculated by the slave-side node is stored in the Pdelay_Req message.

Time slave Si compares absolute value |ΔT| of time adjustment value ΔT to maximum time adjustment value ΔTmax (i+1), and selects the greater absolute value. Time slave Si sets the selected absolute value to maximum time adjustment value ΔTmaxi. Time slave Si stores set maximum time adjustment value ΔTmaxi in the time synchronization packet (Pdelay_Req message) transmitted to the master-side node in the next time synchronization processing. Thus, the master-side node is notified of updated maximum time adjustment value ΔTmaxi (step S01).

According to the processing procedure in FIG. 8, each of time slaves S1 to Sn notifies the master-side node of maximum time adjustment value ΔTmaxi, so that time slave S1 finally notifies time master M of maximum time adjustment value ΔTmax1.

Figure 9:
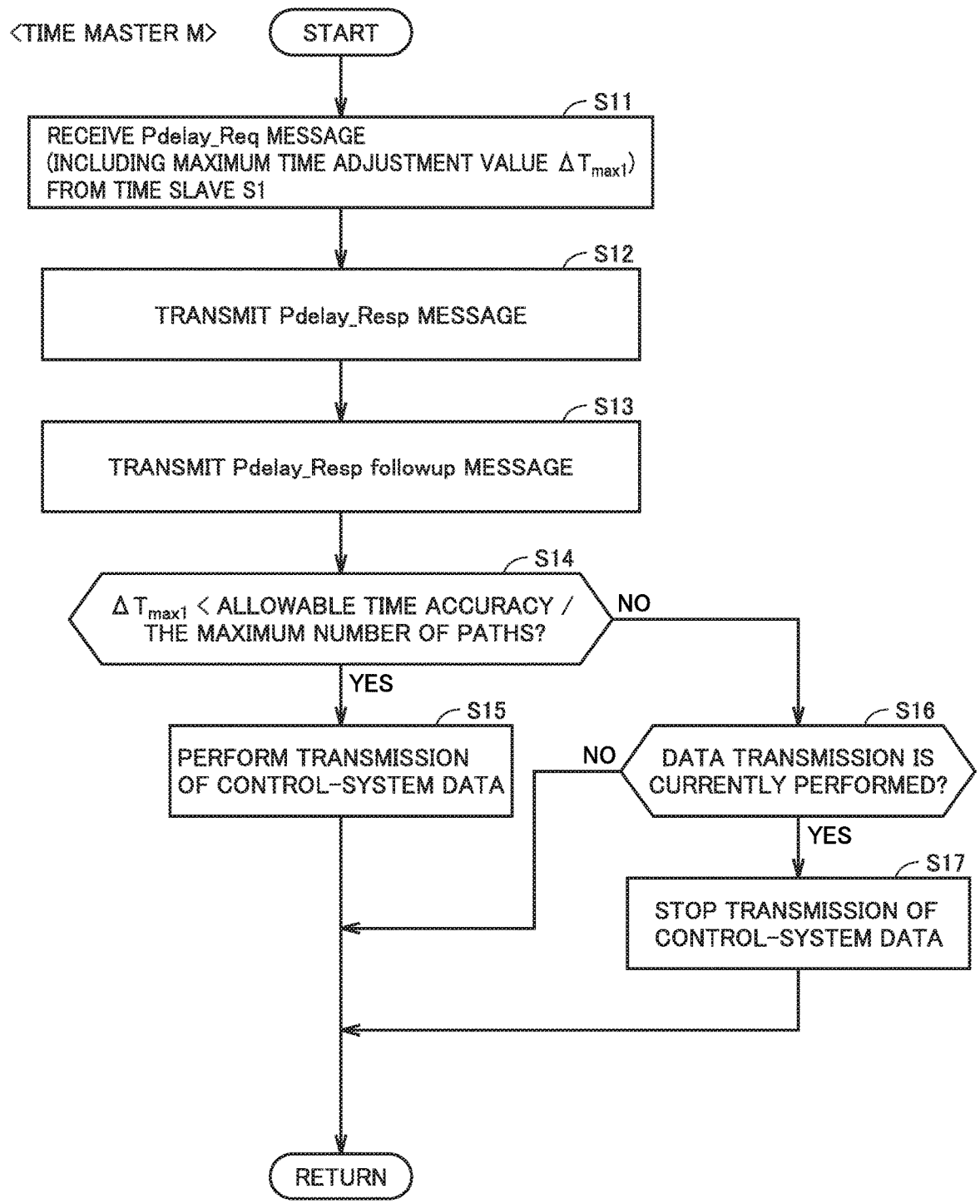
FIG. 9 is a flowchart illustrating a processing procedure by a time master constituting the communication system of the embodiment.

FIG. 9 is a flowchart illustrating a processing procedure by time master M constituting communication system 1 of the embodiment. The flowchart in FIG. 9 is performed at a predetermined cycle.

With reference to FIG. 9, time master M receives the time synchronization packet (Pdelay_Req message) from the slave-side node (time slave S1) (step S11). Maximum time adjustment value ΔTmax1 calculated by time slave S1 is stored in the Pdelay_Req message.

Time master M transmits the time synchronization packet (Pdelay_Resp message) to time slave S1 (step S12). The Pdelay_Resp message includes time T2 time master M receives the Pdelay_Req message.

Time master M further transmits the time synchronization packet (Pdelay_Resp followup message) to time slave S1 (step S13). The Pdelay_Resp followup message includes time T3 time master M transmits the Pdelay_Resp message.

Subsequently, time master M compares maximum time adjustment value ΔTmax1 received from time slave S1 to the threshold (allowable time accuracy/the maximum number of paths) (step S14). When maximum time adjustment value ΔTmax1 is less than the threshold (YES in S14), time master M determines that the time synchronization of time slaves S1 to S3 is completed, and performs the transmission of the control-system data with time slaves S1 to S3 (step S15).

On the other hand, when maximum time adjustment value ΔTmax1 is greater than or equal to the threshold (NO in S14), time master M further determines whether the transmission of the control-system data is currently performed (step S16). When the transmission of the control-system data is currently performed (YES in S16), time master M stops the transmission of the control-system data (step S17). On the other hand, when the transmission of the control-system data is not performed (NO in S16), time master M does not start the transmission of the control-system data.

(f2. Configuration Example 2 of Communication Unit)

Figure 10:
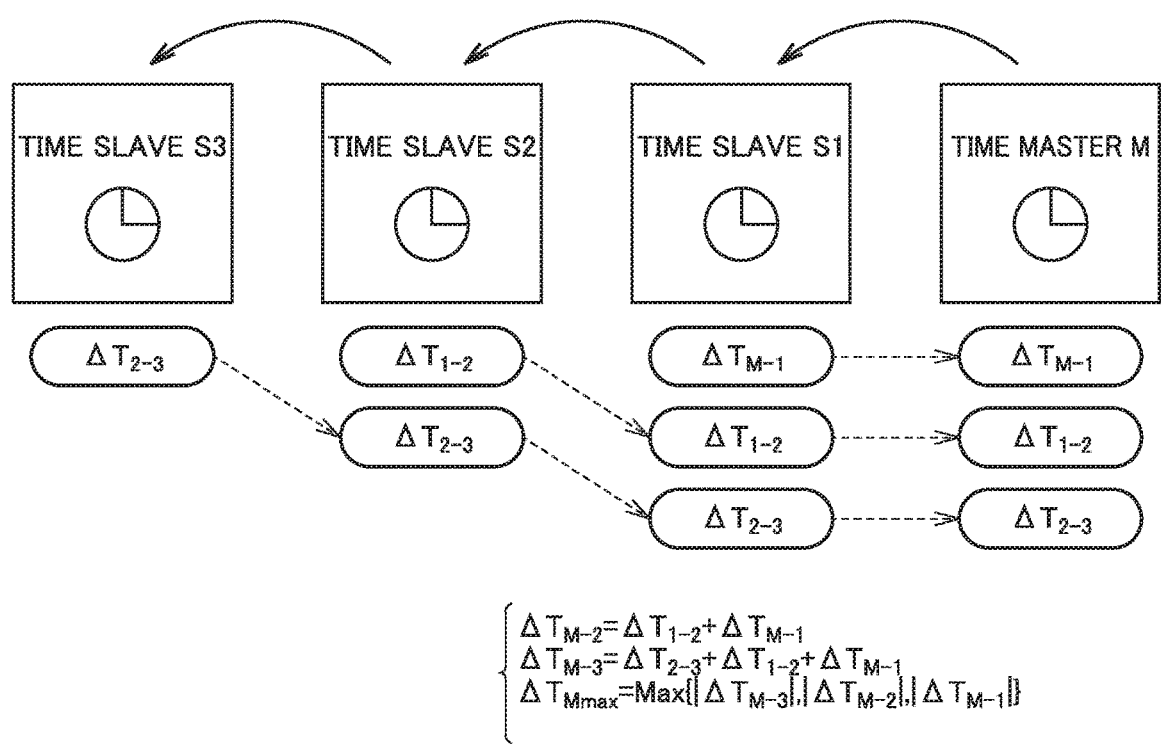
FIG. 10 is a view schematically illustrating a configuration example 2 of a communication unit of the embodiment.

FIG. 10 is a view schematically illustrating a configuration example 2 of the communication unit of the embodiment. Also in this configuration example, similarly to the configuration example 1, the communication unit is configured to make the notification of time adjustment value ΔT used for the time correction of the slave clock of the own device as time synchronization information.

With reference to FIG. 10, time slave S3 performs the time synchronization processing (see FIG. 5) with time slave S2, thereby calculating time difference $\Delta T_{2-3}$ of the time of time slave S3 to the time of time slave S2. Time slave S3 notifies time slave S2 of calculated time adjustment value $\Delta T_{2-3}$.

Time slave S2 performs the time synchronization processing with time slave S1, thereby calculating a difference $\Delta T_{1-2}$ of the time of time slave S2 to the time of time slave S1. Time slave S2 notifies time slave S1 of time adjustment value $\Delta T_{2-3}$ received from time slave S3 and calculated time adjustment value $\Delta T_{1-2}$.

Time slave S1 performs the time synchronization processing with time master M, thereby calculating difference $\Delta T_{M-1}$ of the time of time slave S1 to the time of time master M. Time slave S1 notifies time master M of time adjustment values $\Delta T_{2-3}$ and $\Delta T_{1-2}$ received from time slave S2 and time adjustment value $\Delta T_{M-1}$.

Time master M determines whether the time synchronization of time slaves S1 to S3 is completed based on time adjustment values $\Delta T_{2-3}$, $\Delta T_{1-2}$, $\Delta T_{M-1}$. Specifically, time master M adds time adjustment values $\Delta T_{1-2}$ and $\Delta T_{M-1}$ to calculate difference (time adjustment value) $\Delta T_{M-2}$ of the time of time slave S2 to the time of time master M. Time adjustment value $\Delta T_{M-2}$ is given by the following equation (13).

$$\Delta T_{M-2} = \Delta T_{1-2} + \Delta T_{M-1} \quad (13)$$

Time master M further adds time adjustment values $\Delta T_{2-3}$, $\Delta T_{1-2}$ and $\Delta T_{M-1}$ to calculate difference (time adjustment value) $\Delta T_{M-3}$ of the time of time slave S3 to the time of time master M. Time adjustment value $\Delta T_{M-3}$ is given by the following equation (14).

$$\Delta T_{M-3} = \Delta T_{2-3} + \Delta T_{1-2} + \Delta T_{M-1} \quad (14)$$

Subsequently, time master M selects the greatest one of the absolute values of time adjustment values $\Delta T_{M-1}$, $\Delta T_{M-2}$, $\Delta T_{M-3}$. Time master M sets the absolute value of the selected time adjustment value to maximum time adjustment value $\Delta TMmax$. The maximum time adjustment value $\Delta TMmax$ is given by the following equation (15).

$$\Delta TMmax = \text{Max}\{|\Delta T_{M-3}|, |\Delta T_{M-2}|, |\Delta T_{M-1}|\} \quad (15)$$

Time master M compares maximum time adjustment value $\Delta TMmax$ to the allowable time accuracy, and determines that the time synchronization of time slaves S1 to S3 is completed when maximum time adjustment value $\Delta TMmax$ is less than the allowable time accuracy. When determining that the time synchronization is completed, time master M starts the transmission of control-system data with time slaves S1 to S3. On the other hand, when maximum time adjustment value $\Delta TMmax$ is greater than the allowable time accuracy, time master M determines that the time synchronization of time slaves S1 to S3 is not completed, and does not start the transmission of the control-system data. When maximum time adjustment value $\Delta TMmax$ exceeds the allowable time accuracy during the performance of the data transmission, time master M determines that the time synchronization between time master M and time slaves S1 to S3 fails, and stops the transmission of the control-system data. With this configuration, in the data transmission of communication system 1 in FIG. 1, control device 100 can stably manage the transmission and reception timing of the control-system data of the plurality of devices 200A to 200C.

Figure 11:
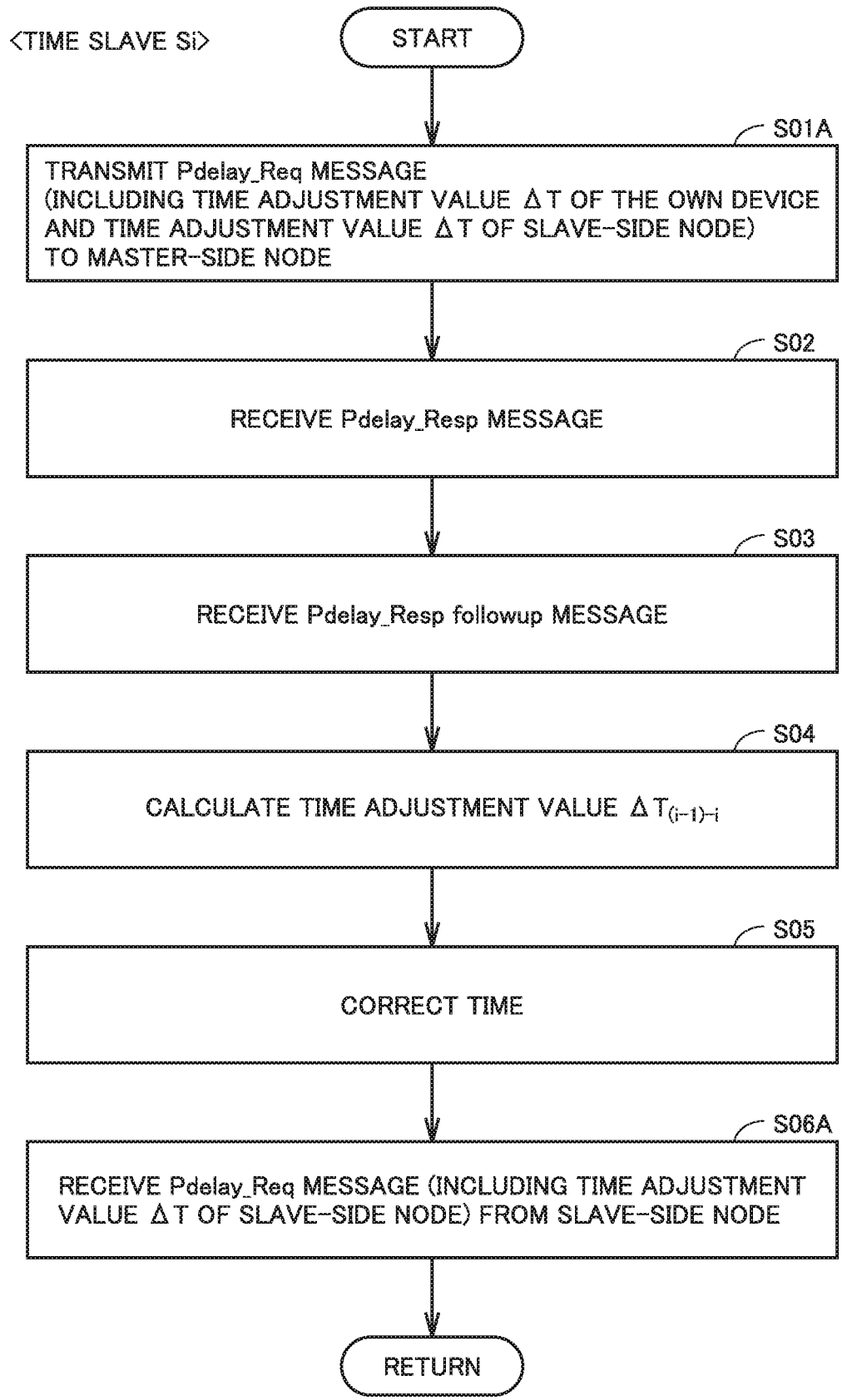
FIG. 11 is a flowchart illustrating the processing procedure by the time slave constituting the communication system of the embodiment.

FIG. 11 is a flowchart illustrating the processing procedure by time slave S constituting communication system 1 of the embodiment. FIG. 11 illustrates the processing procedure by one time slave Si (1≤i≤3) in the plurality of time slaves S1 to S3 (S3 corresponds to the terminal slave) sequentially connected to time master M. The flowchart in FIG. 11 is different from the flowchart illustrated in FIG. 8 in that steps S01, S06 are replaced with steps S01A, S06A, respectively.

With reference to FIG. 11, time slave S1 transmits the time synchronization packet (Pdelay_Req message) to the master-side node (corresponding to time slave S(i−1) or time master M) (step S01A). Time slave Si stores time adjustment value $\Delta T$ of the own device and time adjustment value $\Delta T$ received from the slave-side node (corresponding to time slave S(i+1)) in the Pdelay_Req message. Time slave Si records time T1 the Pdelay_Req message is transmitted (see FIG. 6).

Subsequently, time slave Si receives the time synchronization packet (Pdelay_Resp message) from the master-side node (step S02). Time slave S1 further receives the time synchronization packet (Pdelay_Resp followup message) from the master-side node (step S03). Time slave Si calculates difference (time adjustment value) $\Delta T$ of the time of time slave Si to the time of the master-side node based on four times T1, T2, T3, T4 (step S04). Time slave Si corrects the time of the clock of the own device using time adjustment value $\Delta T$ (step S05).

Subsequently, time slave Si receives the time synchronization packet (Pdelay_Req message) from the slave-side node (step S06A). Time adjustment value $\Delta T$ at the slaves-de node is stored in the Pdelay_Req message. Time adjustment value $\Delta T$ at the slave-side node includes time adjustment values $\Delta T$ of all time slaves S located on the slave side of the own device. Time slave Si stores received time adjustment value $\Delta T$ and time adjustment value $\Delta T$ of the own device in the time synchronization packet (Pdelay_Req message) to be transmitted to the master-side node in the next time synchronization processing. Thus, the master-side node is notified of updated time adjustment value $\Delta T$ (step S01A).

According to the processing procedure in FIG. 11, each of time slaves S1 to Sn notifies the master-side node of time adjustment value $\Delta T$, so that time master M is finally notified of all time adjustment values $\Delta T$ of time slaves S1 to S3.

Figure 12:
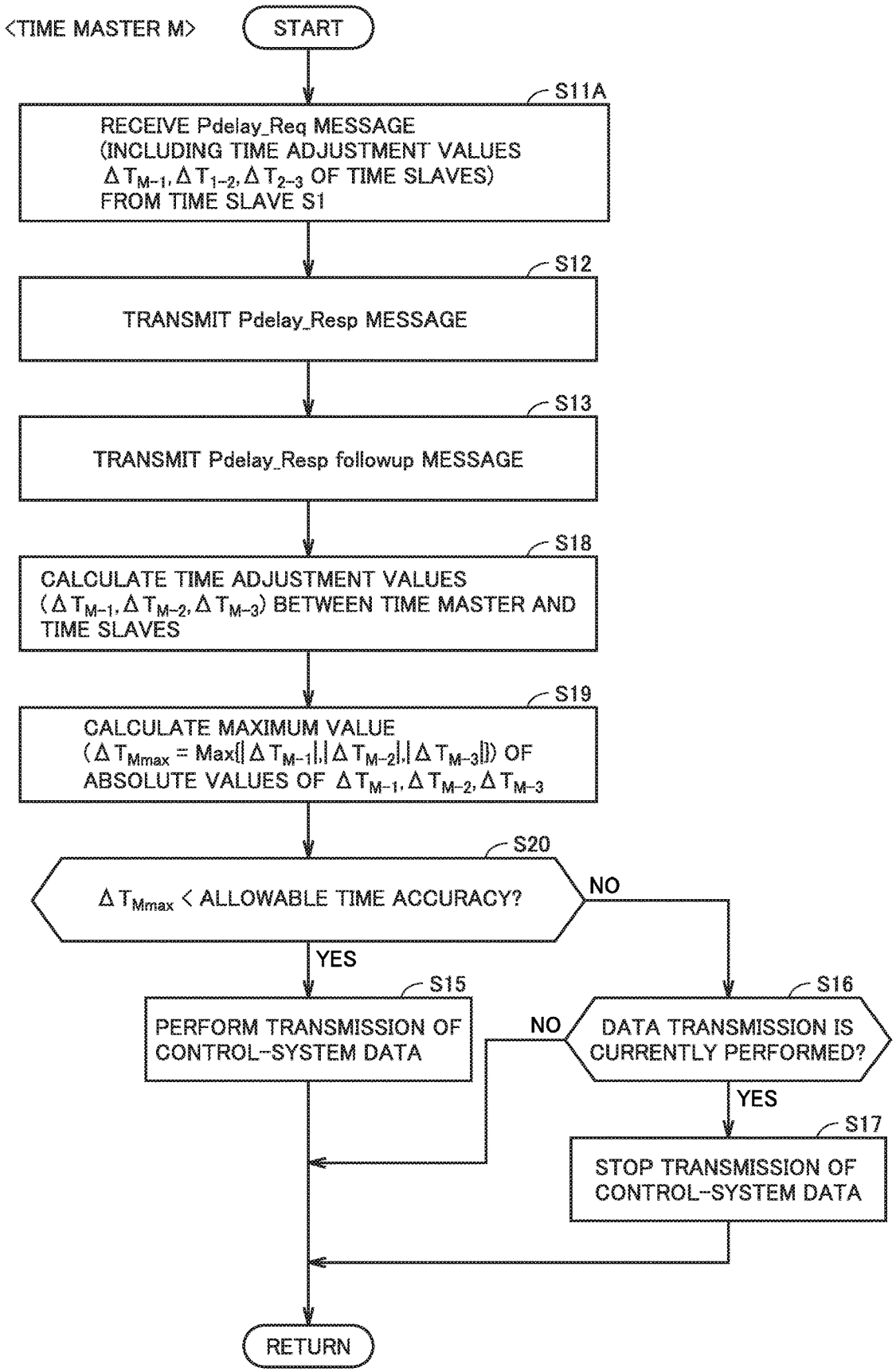
FIG. 12 is a flowchart illustrating the processing procedure by the time master constituting the communication system of the embodiment.

FIG. 12 is a flowchart illustrating the processing procedure by time master M constituting communication system 1 of the embodiment. The flowchart in FIG. 12 is different from the flowchart in FIG. 9 in that step S11 is replaced with step S11A and that steps S18 to S20 are added.

With reference to FIG. 12, time master M receives the time synchronization packet (Pdelay_Req message) from the slave-side node (time slave S1) (step S11A). Time adjustment values $\Delta T_{2-3}$, $\Delta T_{1-2}$, $\Delta T_{M-1}$ of time slaves S1 to S3 are stored in the Pdelay_Req message.

Time master M transmits the time synchronization packet (Pdelay_Resp message) to time slave S1 (step S12). Time master M further transmits the time synchronization packet (Pdelay_Resp followup message) to time slave S1 (step S13).

Subsequently, time master M calculates the difference (time adjustment value) $\Delta T_{M-2}$, $\Delta T_{M-3}$ of the time of time slaves S2 and S3 to the time of time master M based on time adjustment values $\Delta T_{2-3}$, $\Delta T_{1-2}$, $\Delta T_{M-1}$ received from time slave S1 (step S18). Subsequently, time master M obtains the maximum value (maximum time adjustment value $\Delta TMmax$) of the absolute values of calculated time adjustment values $\Delta T_{M-3}$, $\Delta T_{M-2}$, $\Delta T_{M-1}$ (step S19).

Subsequently, time master M compares maximum time adjustment value $\Delta TMmax$ to the allowable time accuracy (step S20). When maximum time adjustment value $\Delta TMmax$ is less than the allowable time accuracy (YES in S20), time master M determines that the time synchronization of time slaves S1 to S3 is completed, and performs the transmission of the control-system data with time slaves S1 to S3 (step S15).

On the other hand, when maximum time adjustment value $\Delta TMmax$ is greater than or equal to the allowable time accuracy (NO in S20), time master M further determines whether the transmission of the control-system data is currently performed (step S16). When the transmission of the control-system data is currently performed (YES in S16), time master M stops the transmission of the control-system data (step S17). On the other hand, when the transmission of the control-system data is not performed (NO in S16), time master M does not start the transmission of the control-system data.

(f3. Configuration Example 3 of Communication Unit)

Figure 13:
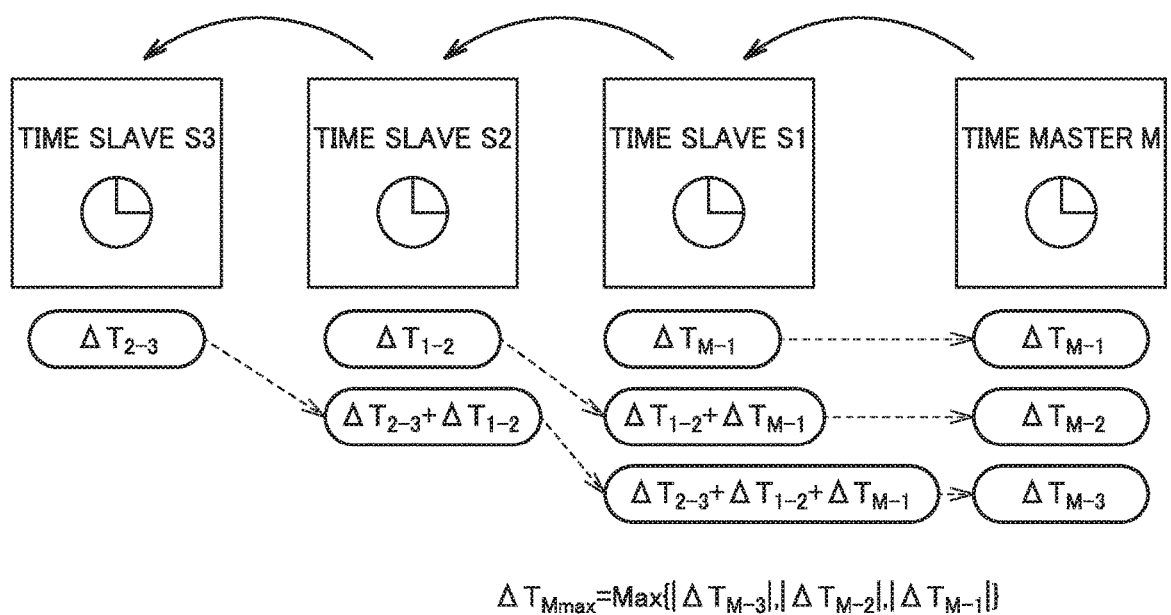
FIG. 13 is a view schematically illustrating a configuration example 3 of the communication unit of the embodiment.

FIG. 13 is a view schematically illustrating a configuration example 3 of the communication unit of the embodiment. Also in this configuration example, similarly to the configuration examples 1, 2, the communication unit is configured to make the notification of time adjustment value ΔT used for the time correction of the slave clock of the own device as time synchronization information.

With reference to FIG. 13, time slave S3 performs the time synchronization processing (see FIG. 6) with time slave S2, thereby calculating difference $\Delta T_{2-3}$ of the time of time slave S3 to the time of time slave S2. Time slave S3 notifies time slave S2 of calculated time adjustment value $\Delta T_{2-3}$.

Time slave S2 performs the time synchronization processing with time slave S1, thereby calculating a difference $\Delta T_{1-2}$ of the time of time slave S2 to the time of time slave S1. Time slave S2 adds time adjustment value $\Delta T_{2-3}$ received from time slave S3 and calculated time adjustment value $\Delta T_{1-2}$. Time slave S2 notifies time slave S1 of a sum $(\Delta T_{2-3}+\Delta T_{1-2})$ and time adjustment value $\Delta T_{1-2}$.

Time slave S1 performs the time synchronization processing with time master M, thereby calculating difference $\Delta T_{M-1}$ of the time of time slave S1 to the time of time master M. Time slave S1 adds the sum $(\Delta T_{2-3}+\Delta T_{1-2})$ received from time slave S2 and time adjustment value $\Delta T_{M-1}$. Time slave S1 also adds time adjustment value $\Delta T_{1-2}$ received from time slave S2 and time adjustment value $\Delta T_{M-1}$. Time slave S1 notifies time master M of the sums $(\Delta T_{2-3}+\Delta T_{1-2}+\Delta T_{M-1})$, $(\Delta T_{1-2}+\Delta T_{M-1})$ and time adjustment value $\Delta T_{M-1}$.

At this point, as can be seen from the equation (14), the sum $(\Delta T_{2-3}+\Delta T_{1-2}+\Delta T_{M-1})$ corresponds to difference (time adjustment value) $\Delta T_{M-3}$ of the time of time slave S3 to the time of time master M. As can be seen from the equation (13), the sum $(\Delta\Delta T_{1-2}+\Delta T_{M-1})$ corresponds to difference (time adjustment value) $\Delta T_{M-2}$ of the time of time slave S2 to the time of time master M.

Time master M sets the greatest one of the absolute values of time adjustment values $\Delta T_{M-1}$, $\Delta T_{M-2}$, $\Delta T_{M-3}$ to maximum time adjustment value ΔTMmax using equation (15). Time master M compares maximum time adjustment value ΔTMmax to the allowable time accuracy, and determines that the time synchronization of time slaves S1 to S3 is completed when maximum time adjustment value ΔTMmax is less than the allowable time accuracy. When determining that the time synchronization is completed, time master M starts the transmission of control-system data with time slaves S1 to S3. On the other hand, when maximum time adjustment value ΔTMmax is greater than the allowable time accuracy, time master M determines that the time synchronization of time slaves S1 to S3 is not completed, and does not start the transmission of the control-system data. When maximum time adjustment value ΔTMmax exceeds the allowable time accuracy during the performance of the data transmission, time master M determines that the time synchronization between time master M and time slaves S1 to S3 fails, and stops the transmission of the control-system data. With this configuration, in the data transmission of communication system 1 in FIG. 1, control device 100 can stably manage the transmission and reception timing of the control-system data of the plurality of devices 200A to 200C.

Figure 14:
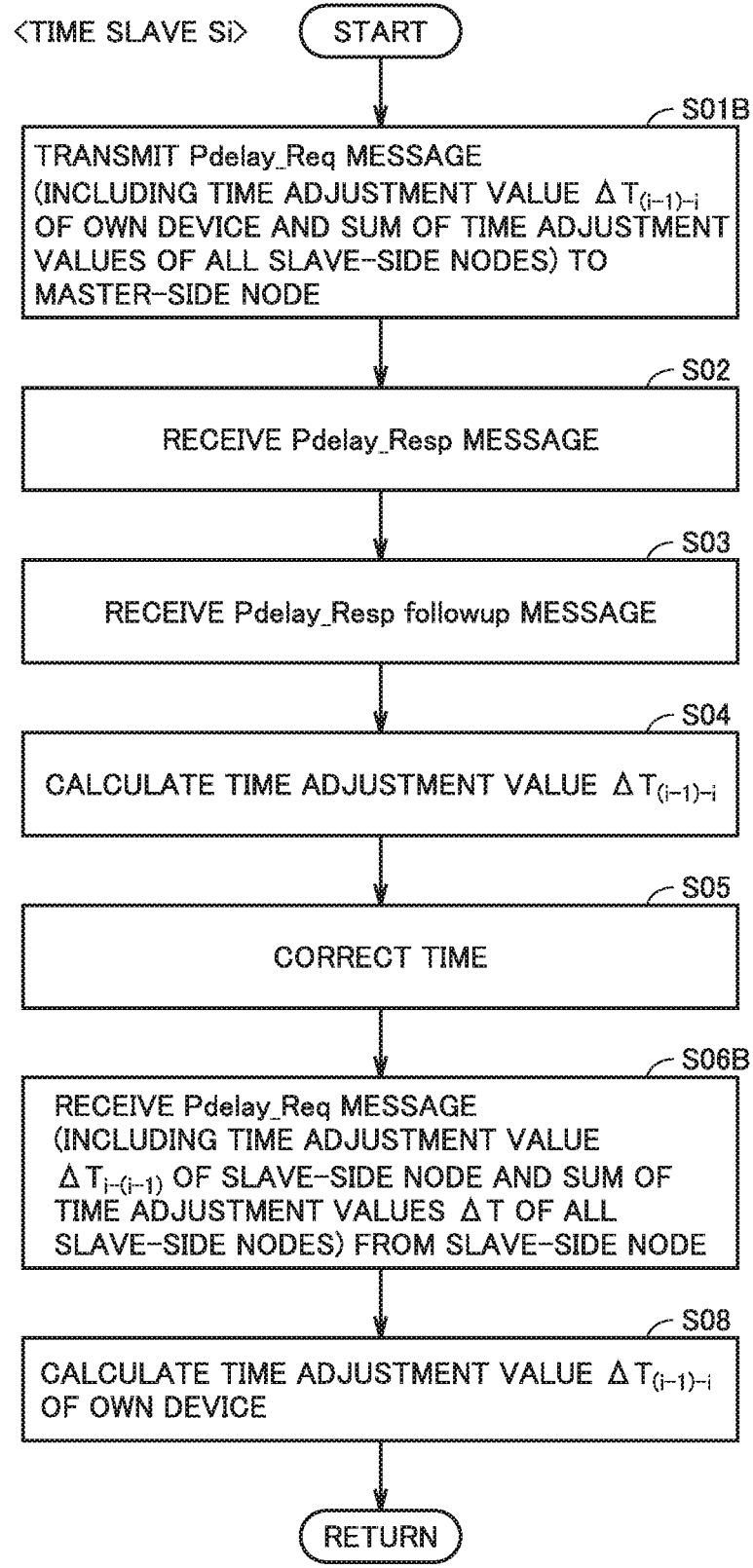
FIG. 14 is a flowchart illustrating the processing procedure by the time slave constituting the communication system of the embodiment.

FIG. 14 is a flowchart illustrating the processing procedure by time slave S constituting communication system 1 of the embodiment. FIG. 14 illustrates the processing procedure by one time slave Si (1≤i≤3) in the plurality of time slaves S1 to S3 (S3 corresponds to the terminal slave) sequentially connected to time master M. The flowchart in FIG. 14 is different from the flowchart in FIG. 8 in that steps S01, S06 are replaced with steps S01B, S06B, respectively, and that step S08 is added.

With reference to FIG. 14, time slave Si transmits the time synchronization packet (Pdelay_Req message) to the master-side node (corresponding to time slave S(i−1) or time master M) (step S01B). Time slave Si stores time adjustment value ΔT of the own device and the sum of time adjustment value ΔT of the own device and time adjustment value ΔT received from the slave-side node (corresponding to time slave S(i+1)) in the Pdelay_Req message. Time slave Si records time T1 the Pdelay_Req message is transmitted (see FIG. 6).

Subsequently, time slave Si receives the time synchronization packet (Pdelay_Resp message) from the master-side node (step S02). Time slave Si further receives the time synchronization packet (Pdelay_Resp followup message) from the master-side node (step S03). Time slave Si calculates difference (time adjustment value) ΔT of the time of time slave Si to the time of the master-side node based on four times T1, T2, T3, T4 (step S04). Time slave Si corrects the time of the clock of the own device using time adjustment value ΔT (step S05).

Subsequently, time slave Si receives the time synchronization packet (Pdelay_Req message) from the slave-side node (step S06B). Time adjustment value ΔT at the slave-side node and the sum of the time adjustment values ΔT calculated at the slave-side node are stored in the Pdelay_Req message. Time slave S1 adds received time adjustment value ΔT and time adjustment value ΔT of the own device (step S08). Time slave Si stores the sum and time adjustment value ΔT of the own device in the time synchronization packet (Pdelay_Req message) to be transmitted to the master-side node in the next time synchronization processing. Thus, the master-side node is notified of updated time adjustment value ΔT and the sum (step S01B).

According to the processing procedure illustrated in FIG. 14, the master-side node is notified of the sum obtained by adding time adjustment value ΔT of the own device to the sum of time adjustment values ΔT transmitted from the slave-side node, which allows time master M to be finally notified of differences (time adjustment values) $\Delta T_{M-1}$, $\Delta T_{M-2}$, $\Delta T_{M-3}$ between the time of time master M and the times of time slaves S1 to S3.

Figure 15:
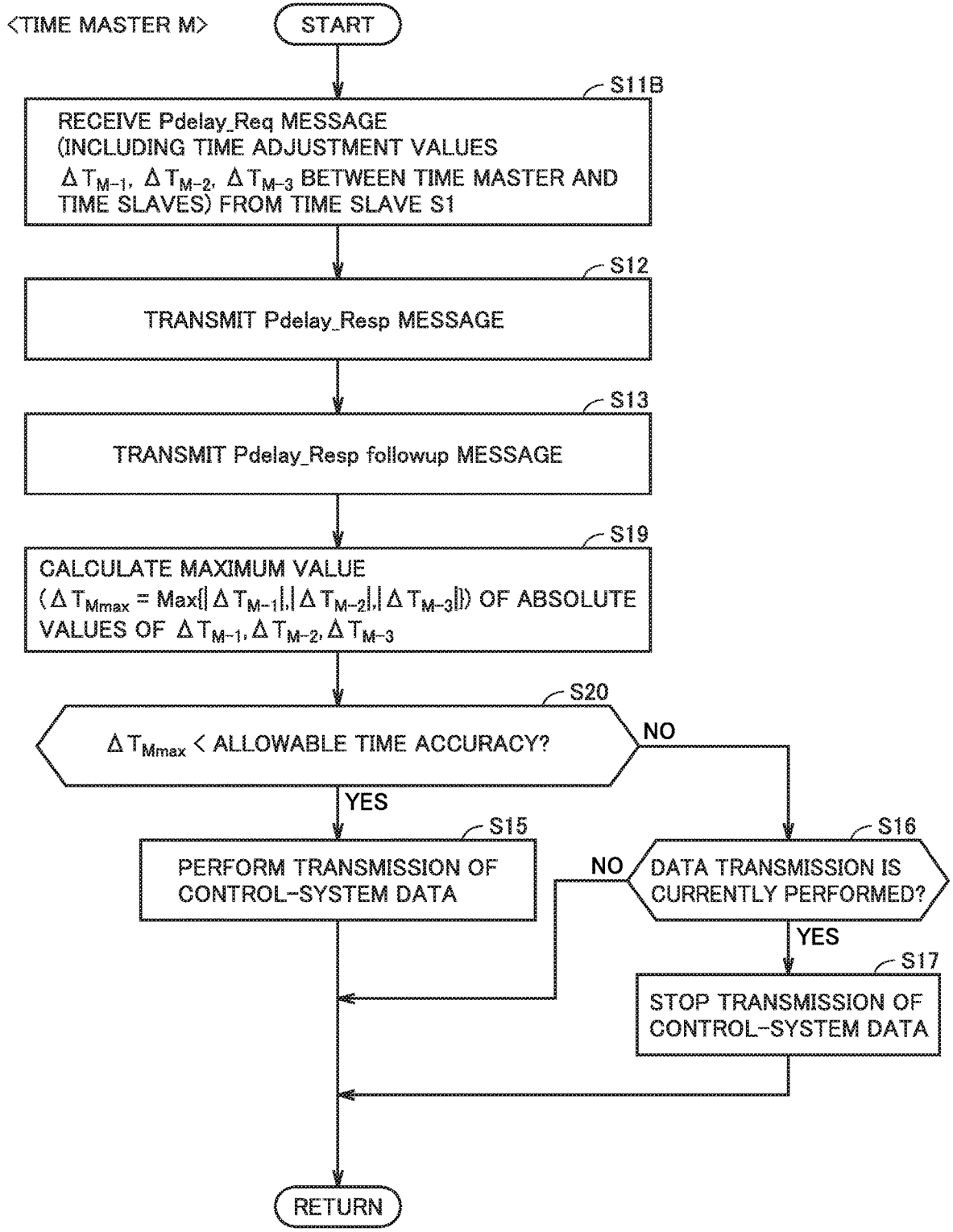
FIG. 15 is a flowchart illustrating the processing procedure by the time master constituting the communication system of the embodiment.

FIG. 15 is a flowchart illustrating the processing procedure by time master M constituting communication system 1 of the embodiment. The flowchart in FIG. 15 is different from the flowchart in FIG. 9 in that step S11 is replaced with step S11B and that steps S19, S20 are added.

With reference to FIG. 15, time master M receives the time synchronization packet (Pdelay_Req message) from the slave-side node (time slave S1) (step S11B). Time adjustment values $\Delta T_{M-3}$, $\Delta T_{M-2}$, $\Delta T_{M-1}$ that are differences between the time of time master M and the times of time slaves S1 to S3 are stored in the Pdelay_Req message.

Time master M transmits the time synchronization packet (Pdelay_Resp message) to time slave S1 (step S12). Time master M further transmits the time synchronization packet (Pdelay_Resp followup message) to time slave S1 (step S13).

Time master M obtains the maximum value (maximum time adjustment value ΔTMmax) of the absolute values of time adjustment values $\Delta T_{M-3}$, $\Delta T_{M-2}$, $\Delta T_{M-1}$ received from time slave S1 (step S19). Subsequently, time master M compares maximum time adjustment value ΔTMmax to the allowable time accuracy (step S20). When maximum time adjustment value ΔTMmax is less than the allowable time accuracy (YES in S20), time master M determines that the time synchronization of time slaves S1 to S3 is completed, and performs the transmission of the control-system data with time slaves S1 to S3 (step S15).

On the other hand, when maximum time adjustment value ΔTMmax is greater than or equal to the allowable time accuracy (NO in S20), time master M further determines whether the transmission of the control-system data is currently performed (step S16). When the transmission of the control-system data is currently performed (YES in S16), time master M stops the transmission of the control-system data (step S17). On the other hand, when the transmission of the control-system data is not performed (NO in S16), time master M does not start the transmission of the control-system data.

(f4. Configuration Example 4 of Communication Unit)

Figure 16:
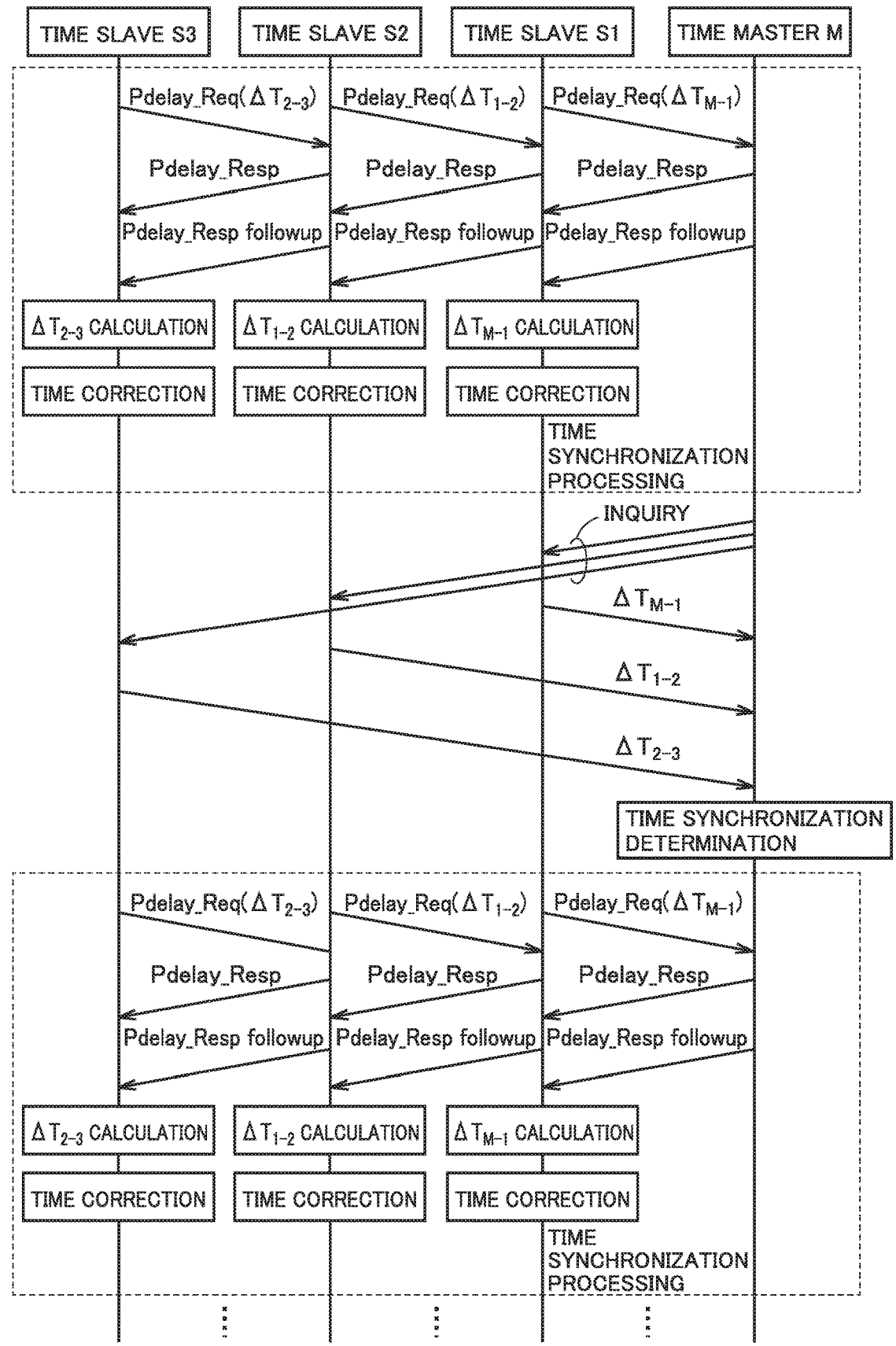
FIG. 16 is a sequence diagram illustrating the time synchronization processing including a fourth example of the communication unit of the embodiment.

FIG. 16 is a sequence diagram illustrating the time synchronization processing including a fourth example of the communication unit of the embodiment.

With reference to FIG. 16, when the time synchronization processing is started in communication system 1, time slave S3 exchanges the time synchronization packet with time slave S2, and calculates time adjustment value $\Delta T_{2-3}$ based on information obtained through the process. Time slave S3 corrects the time of the slave clock of time slave S3 using calculated time adjustment value $\Delta T_{2-3}$.

Time slave S2 exchanges the time synchronization packet with time slave S1, and calculates time adjustment value $\Delta T_{1-2}$ based on information obtained through the process. Time slave S2 corrects the time of the slave clock of time slave S2 using calculated time adjustment value $\Delta T_{1-2}$.

Time slave S1 exchanges the time synchronization packet with time master M, and calculates time adjustment value $\Delta T_{M-1}$ based on information obtained through the process. Time slave S1 corrects the time of the slave clock of time slave S1 using calculated time adjustment value $\Delta T_{M-1}$.

After the time synchronization processing is performed, time master M inquires of time slaves S1 to S3 about time adjustment value ΔT. Each time slave S notifies time master M of time adjustment value ΔT of the own device in response to the inquiry.

Time master M determines whether the time synchronization of time slaves S1 to S3 is completed based on time adjustment values $\Delta T_{2-3}$, $\Delta T_{1-2}$, $\Delta T_{M-1}$. Specifically, time master M adds time adjustment values $\Delta T_{1-2}$ and $\Delta T_{M-1}$ to calculate difference (time adjustment value) $\Delta T_{M-2}$ of the time of time slave S2 to the time of time master M. Time master M further adds time adjustment values $\Delta T_{2-3}$, $\Delta T_{1-2}$ and $\Delta T_{M-1}$ to calculate difference (time adjustment value) $\Delta T_{M-3}$ of the time of time slave S3 to the time of time master M.

Subsequently, time master M selects the greatest one of the absolute values of time adjustment values $\Delta T_{M-1}$, $\Delta T_{M-2}$, $\Delta T_{M-3}$. Time master M sets the absolute value of the selected time adjustment value to maximum time adjustment value ΔTMmax. Time master M compares maximum time adjustment value ΔTMmax to the allowable time accuracy, and determines that the time synchronization of time slaves S1 to S3 is completed when maximum time adjustment value ΔTMmax is less than the allowable time accuracy. When determining that the time synchronization is completed, time master M starts the transmission of control-system data with time slaves S1 to S3. On the other hand, when maximum time adjustment value ΔTMmax is greater than the allowable time accuracy, time master M determines that the time synchronization of time slaves S1 to S3 is not completed, and does not start the transmission of the control-system data. When maximum time adjustment value ΔTMmax exceeds the allowable time accuracy during the performance of the data transmission, time master M determines that the time synchronization between time master M and time slaves S1 to S3 fails, and stops the transmission of the control-system data. With this configuration, in the data transmission of communication system 1 in FIG. 1, control device 100 can stably manage the transmission and reception timing of the control-system data of the plurality of devices 200A to 200C.

In this configuration example, the communication unit of each time slave S is configured to notify time master M of time adjustment value ΔT of the own device obtained in the time synchronization processing after the time synchronization processing is executed. When each time slave S notifies time master M of time adjustment value ΔT during the performance of the time synchronization processing, there is a risk that the time synchronization packet and the data indicating time adjustment value ΔT collide with each other on the network. With the configuration example 4, the generation of the collision can be prevented (f5. Configuration Example 5 of Communication Unit)

Figure 17:
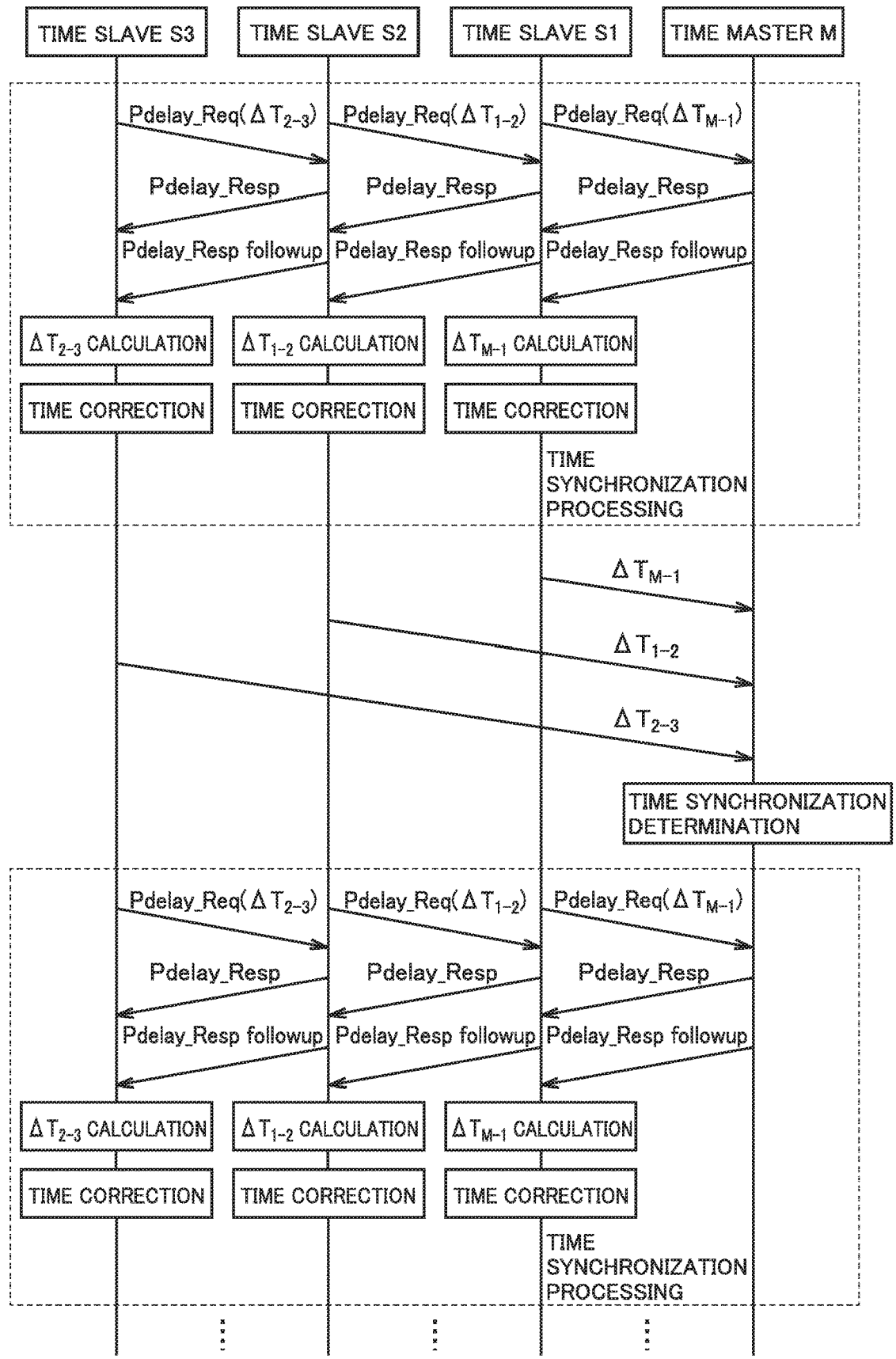
FIG. 17 is a sequence diagram illustrating the time synchronization processing including a fifth example of the communication unit of the embodiment.

FIG. 17 is a sequence diagram illustrating the time synchronization processing including a fifth example of the communication unit of the embodiment.

With reference to FIG. 17, when the time synchronization processing is started in communication system 1, time slave S3 exchanges the time synchronization packet with time slave S2, and calculates time adjustment value $\Delta T_{2-3}$ based on information obtained through the process. Time slave S3 corrects the time of the slave clock of time slave S3 using calculated time adjustment value $\Delta T_{2-3}$.

Time slave S2 exchanges the time synchronization packet with time slave S1, and calculates time adjustment value $\Delta T_{1-2}$ based on information obtained through the process. Time slave S2 corrects the time of the slave clock of time slave S2 using calculated time adjustment value $\Delta T_{1-2}$.

Time slave S1 exchanges the time synchronization packet with time master M, and calculates time adjustment value $\Delta T_{M-1}$ based on information obtained through the process. Time slave S1 corrects the time of the slave clock of time slave S1 using calculated time adjustment value $\Delta T_{M-1}$.

After the time synchronization processing is performed, each of time slaves S1 to S3 notifies time master M of time adjustment value ΔT of the own device. Time master M determines whether the time synchronization of time slaves S1 to S3 is completed based on time adjustment values $\Delta T_{2-3}$, $\Delta T_{1-2}$, $\Delta T_{M-1}$. Specifically, time master M calculates time difference (time adjustment value) $\Delta T_{M-2}$ of the time of time slave S2 to the time of time master M and difference (time adjustment value) $\Delta T_{M-3}$ of the time of time slave S3 to the time of time master M.

Subsequently, time master M selects the greatest one of the absolute values of time adjustment values $\Delta T_{M-1}$, $\Delta T_{M-2}$, $\Delta T_{M-3}$. Time master M sets the absolute value of the selected time adjustment value to maximum time adjustment value ΔTMmax. Time master M compares maximum time adjustment value ΔTMmax to the allowable time accuracy, and determines that the time synchronization of time slaves S1 to S3 is completed when maximum time adjustment value ΔTMmax is less than the allowable time accuracy. When determining that the time synchronization is completed, time master M starts the transmission of control-system data with time slaves S1 to S3. On the other hand, when maximum time adjustment value ΔTMmax is greater than the allowable time accuracy, time master M determines that the time synchronization of time slaves S1 to S3 is not completed, and does not start the transmission of the control-system data. When maximum time adjustment value ΔTMmax exceeds the allowable time accuracy during the performance of the data transmission, time master M determines that the time synchronization between time master M and time slaves S1 to S3 fails, and stops the transmission of the control-system data. With this configuration, in the data transmission of communication system 1 in FIG. 1, control device 100 can stably manage the transmission and reception timing of the control-system data of the plurality of devices 200A to 200C.

With this configuration example, similarly to the configuration example 4, after the time synchronization processing is performed, the communication unit notifies time master M of time adjustment value ΔT of the own device obtained in the time synchronization processing. Thus, during the performance of the time synchronization processing, the time synchronization packet and the data indicating time adjustment value ΔT can be prevented from colliding with each other on the network.

The configuration in which the time synchronization processing of time slaves S1 to S3 is performed at the timings equal to each other is described in the configuration examples 1 to 5 of the communication unit. However, the timing of performing the time synchronization processing may vary among the time slaves. In this case, time master M can determine the completion of the time synchronization in the timing of collecting the pieces of time synchronization information of all time slaves S.

G. MODIFICATION OF COMMUNICATION SYSTEM

The configuration example in which control device 100 (control master) functions as the time master is described in communication system 1 of FIG. 1. Alternatively, control device 100 may be time-synchronized with another communication device. At this point, the other communication device functions as the time master, and control device 100 (control master) functions as the time slave. For example, a configuration example in which one device 200 of devices 200A to 200C functions as the time master in communication system 1 of FIG. 1 will be described.

(g1. First Modification of Communication System 1)

Figure 18:
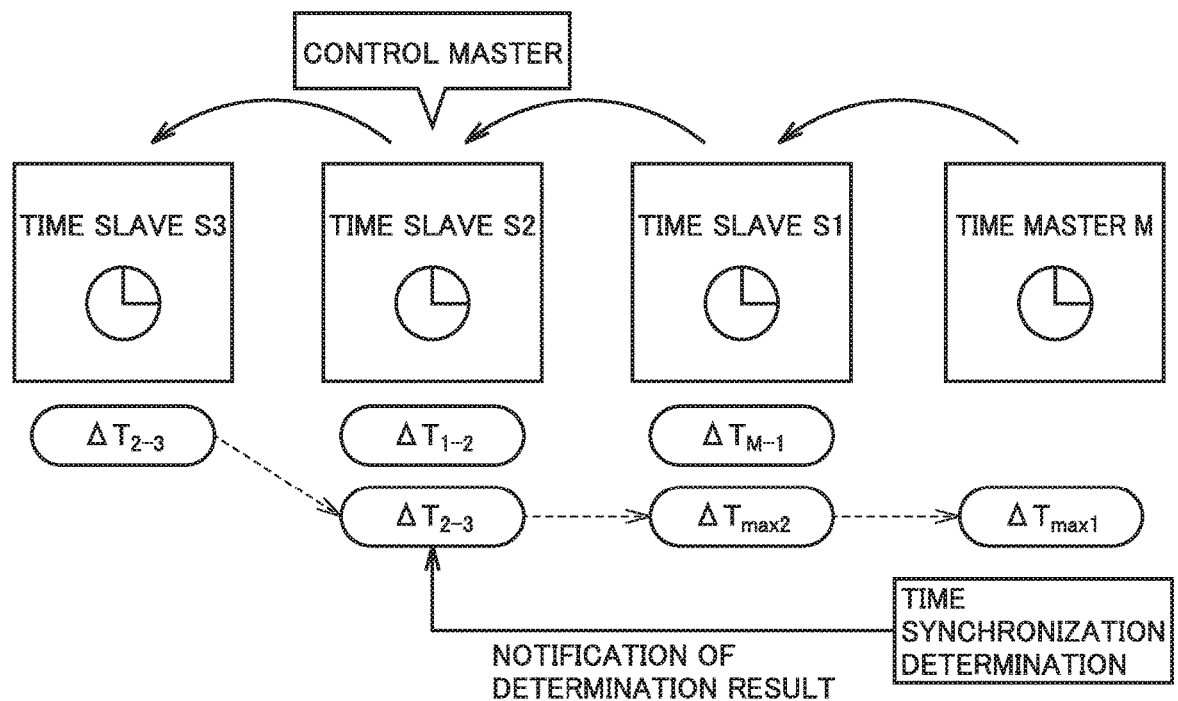
FIG. 18 is a schematic diagram illustrating a time synchronization function provided by a communication system according to a first modification of the embodiment.

FIG. 18 is a schematic diagram illustrating the time synchronization function provided by communication system 1 according to a first modification of the embodiment.

In the configuration example of FIG. 18, time slave S2 corresponds to control device 100 (control master), and time master M and time slaves S1 and S3 correspond to devices 200A to 200C, respectively. Each of time slaves S1 to S3 notifies time master M of time adjustment values $\Delta T_{2-3}$, $\Delta T_{1-2}$, $\Delta T_{M-1}$ calculated in the time synchronization processing of FIG. 7. In FIG. 18, the configuration example 1 of the communication unit in FIG. 6 is applied to each time slave S. Thus, device 200 functioning as time master M is notified of maximum time adjustment value ΔTmax1.

Device 200 that is time master M performs the processing procedure in FIG. 9 to determine whether the time synchronization of time slaves S1 to S3 is completed based on maximum time adjustment value ΔTmax1. Device 200 notifies control device 100 (control master) functioning as time slave S2 of the determination result.

When the determination that the time synchronization of time slaves S1 to S3 is completed is made, control device 100 starts the transmission of control-system data with devices 200A to 200C. On the other hand, when the determination that the time synchronization of time slaves S1 to S3 is not completed is made, control device 100 does not start the transmission of the control-system data. When the determination that the time synchronization between time master M and time slaves S1 to S3 fails is made during the performance of the data transmission, control device 100 stops the transmission of control-system data with devices 200A to 200C. With this configuration, in the data transmission of communication system 1 in FIG. 1, control device 100 can stably manage the transmission and reception timing of the control-system data of the plurality of devices 200A to 200C.

Figure 19:
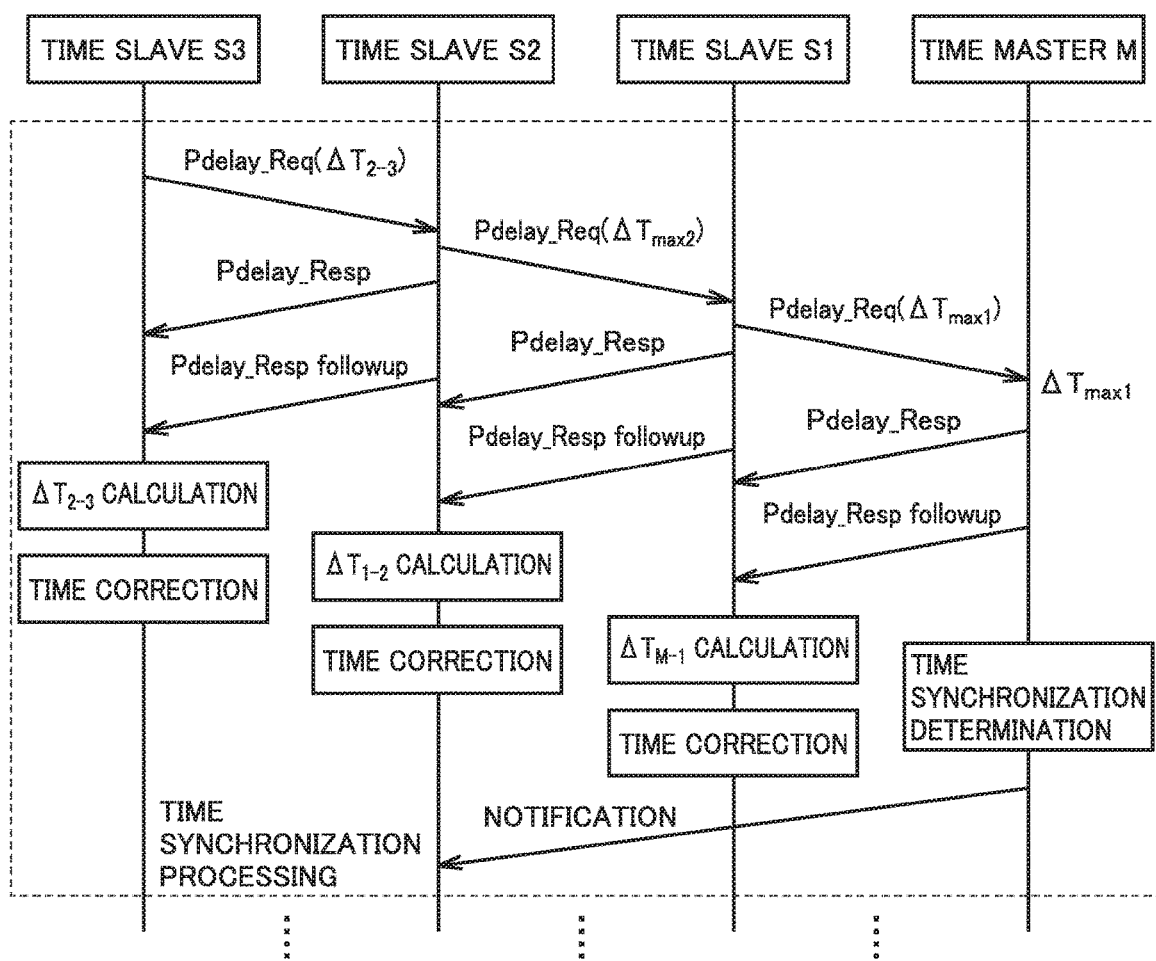
FIG. 19 is a sequence diagram illustrating the time synchronization processing in the communication system of the first modification of the embodiment.

FIG. 19 is a sequence diagram illustrating the time synchronization processing in communication system 1 of the first modification of the embodiment.

With reference to FIG. 19, when the time synchronization processing is started in communication system 1, time slave S3 transmits the Pdelay_Req message to time slave S2. Time slave S3 stores time adjustment value $\Delta T_{2-3}$ calculated in the previous time synchronization processing in the Pdelay_Req message transmitted to time slave S2.

When receiving the Pdelay_Req message, time slave S2 extracts time adjustment value $\Delta T_{2-3}$ stored in the Pdelay_Req message. Time slave S2 transmits the Pdelay_Resp message and the Pdelay_Resp_followup message to time slave S3. Time slave S3 calculates time adjustment value $\Delta T_{2-3}$, and corrects the time of the slave clock of the own device using calculated time adjustment value $\Delta T_{2-3}$.

Time slave S2 calculates the maximum time adjustment value ΔTmax2 by substituting time adjustment value $\Delta T_{2-3}$ received from time slave S3 and time adjustment value $\Delta T_{1-2}$ calculated through the previous time synchronization processing for the equation (10). Time slave S2 stores calculated maximum time adjustment value ΔTmax2 in the Pdelay_Req message transmitted to time slave S1.

When receiving the Pdelay_Req message, time slave S1 extracts maximum time adjustment value ΔTmax2 stored in the Pdelay_Req message. Time slave S1 transmits the Pdelay_Resp message and the Pdelay_Resp_followup message to time slave S2. Time slave S2 calculates time adjustment value $\Delta T_{1-2}$, and corrects the time of the slave clock of the own device using calculated time adjustment value $\Delta T_{1-2}$.

Time slave S1 calculates maximum time adjustment value ΔTmax1 by substituting maximum time adjustment value ΔTmax2 received from time slave S2 and time adjustment value $\Delta T_{M-1}$ calculated through the previous time synchronization processing for the equation (11). Time slave S1 stores calculated maximum time adjustment value ΔTmax1 in the Pdelay_Req message transmitted to time master M.

When receiving the Pdelay_Req message, time master M extracts maximum time adjustment value ΔTmax1 stored in the Pdelay_Req message. Time master M transmits the Pdelay_Resp message and the Pdelay_Resp_followup message to time slave S1. Time slave S1 calculates time adjustment value $\Delta T_{M-1}$, and corrects the time of the slave clock of the own device using calculated time adjustment value $\Delta T_{M-1}$.

Time master M determines whether the time synchronization of time slaves S1 to S3 is completed based on maximum time adjustment value ΔTmax1 received from time slave S1. When maximum time adjustment value ΔTmax1 is less than the threshold (=permissible time accuracy/the maximum number of paths), time master M determines that the time synchronization of time slaves S1 to S3 is completed, and notifies control device 100 (control master) of the determination result. Control device 100 starts the transmission of the control-system data with time slaves S1 to S3.

On the other hand, when maximum time adjustment value ΔTmax1 is greater than the threshold, time master M determines that the time synchronization of time slaves S1 to S3 is not completed, and notifies control device 100 (control master) of the determination result. Control device 100 does not start the transmission of the control-system data. When the data transmission is currently performed, control device 100 stops the transmission of the control-system data.

(g2. Second Modification of Communication System 1)

Figure 20:
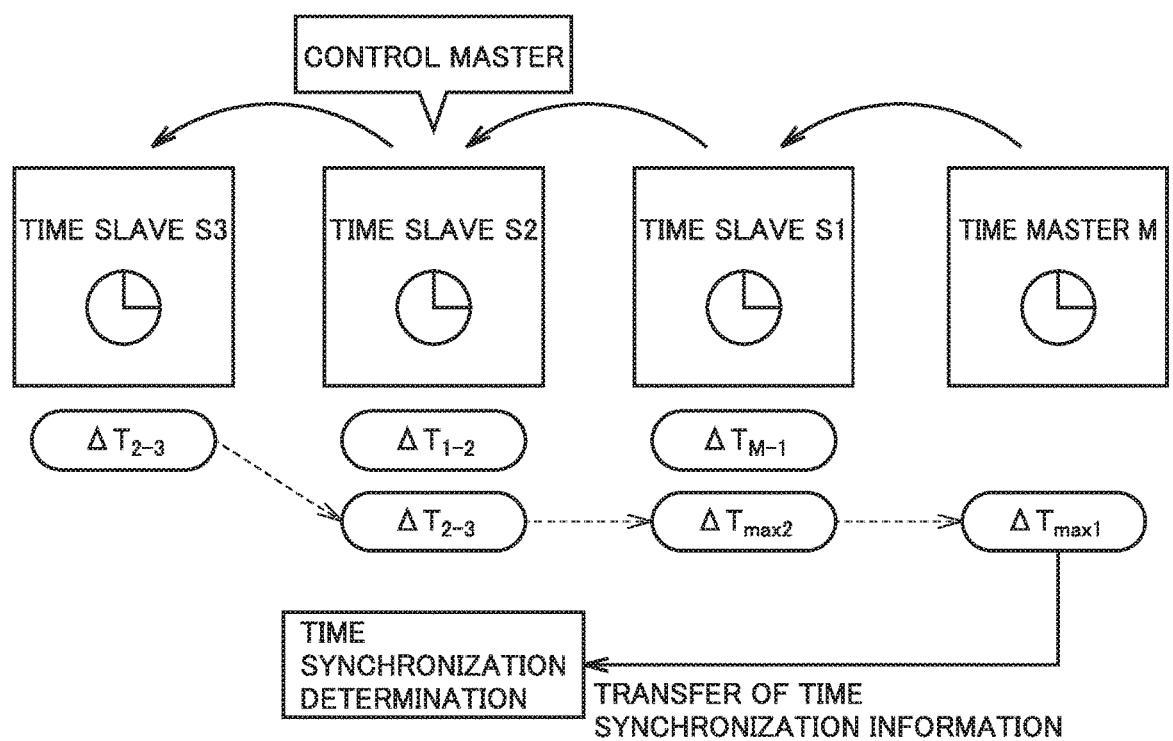
FIG. 20 is a schematic diagram illustrating the time synchronization function provided by a communication system according to a second modification of the embodiment.

FIG. 20 is a schematic diagram illustrating the time synchronization function provided by communication system 1 according to a second modification of the embodiment.

In the configuration example of FIG. 20, as in the configuration example of FIG. 18, time slave S2 corresponds to control device 100, and time master M and time slaves S1 and S3 correspond to devices 200A to 200C, respectively. Each of time slaves S1 to S3 notifies time master M of time adjustment values $\Delta T_{2-3}$, $\Delta T_{1-2}$, $\Delta T_{M-1}$ calculated in the time synchronization processing of FIG. 7. In FIG. 20, the configuration example 1 of the communication unit in FIG. 6 is applied to each time slave S. Device 200 functioning as time master M is notified of maximum time adjustment value ΔTmax1.

In the second modification, time master M transfers notified maximum time adjustment value ΔTmax1 to control device 100 (control master). Control device 100 performs the processing procedure in FIG. 9 to determine whether the time synchronization of time slaves S1 to S3 is completed based on maximum time adjustment value ΔTmax1. When the determination that the time synchronization of time slaves S1 to S3 is completed is made, control device 100 starts the transmission of control-system data with devices 200A to 200C. On the other hand, when the determination that the time synchronization of time slaves S1 to S3 is not completed is made, control device 100 does not start the transmission of the control-system data. When the determination that the time synchronization between time master M and time slaves S1 to S3 fails is made during the performance of the data transmission, control device 100 stops the transmission of control-system data with devices 200A to 200C. Consequently, in the data transmission in communication system 1 of FIG. 1, control device 100 can manage the transmission and reception timings of the control-system data of the plurality of devices 200A to 200C.

Figure 21:
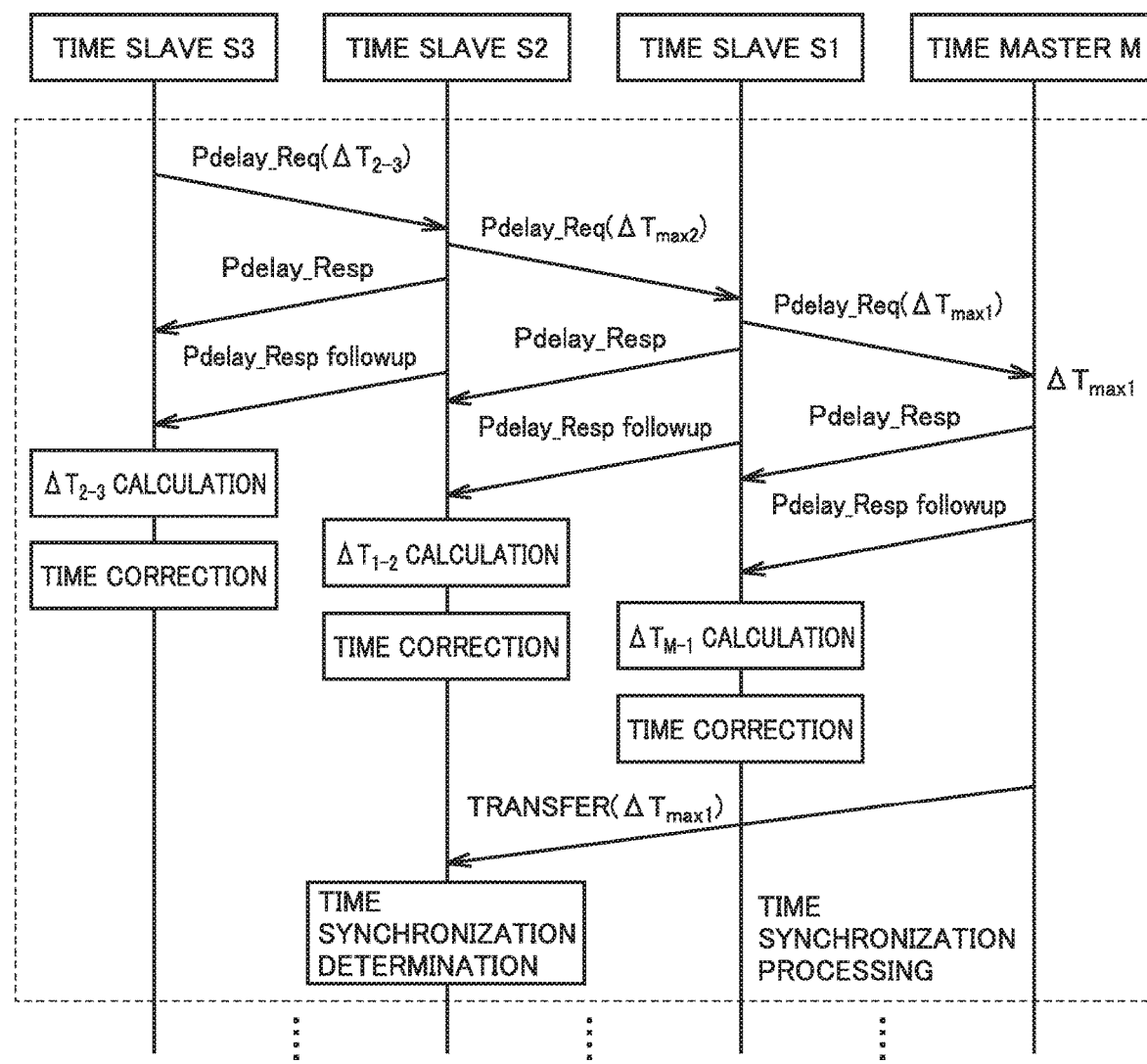
FIG. 21 is a sequence diagram illustrating the time synchronization processing in the communication system of the second modification of the embodiment.

FIG. 21 is a sequence diagram illustrating the time synchronization processing in communication system 1 of the second modification of the embodiment.

With reference to FIG. 21, when the time synchronization processing is started in communication system 1, time slave S3 transmits the Pdelay_Req message to time slave S2. Time slave S3 stores time adjustment value $\Delta T_{2-3}$ calculated in the previous time synchronization processing in the Pdelay_Req message transmitted to time slave S2.

When receiving the Pdelay_Req message, time slave S2 extracts time adjustment value $\Delta T_{2-3}$ stored in the Pdelay_Req message. Time slave S2 transmits the Pdelay_Resp message and the Pdelay_Resp_followup message to time slave S3. Time slave S3 calculates time adjustment value $\Delta T_{2-3}$, and corrects the time of the slave clock of the own device using calculated time adjustment value $\Delta T_{2-3}$.

Time slave S2 calculates the maximum time adjustment value ΔTmax2 by substituting time adjustment value $\Delta T_{2-3}$ received from time slave S3 and time adjustment value $\Delta T_{1-2}$ calculated through the previous time synchronization processing for the equation (10). Time slave S2 stores calculated maximum time adjustment value ΔTmax2 in the Pdelay_Req message transmitted to time slave S1.

When receiving the Pdelay_Req message, time slave S1 extracts maximum time adjustment value ΔTmax2 stored in the Pdelay_Req message. Time slave S1 transmits the Pdelay_Resp message and the Pdelay_Resp_followup message to time slave S2. Time slave S2 calculates time adjustment value $\Delta T_{1-2}$, and corrects the time of the slave clock of the own device using calculated time adjustment value $\Delta T_{1-2}$.

Time slave S1 calculates maximum time adjustment value ΔTmax1 by substituting maximum time adjustment value ΔTmax2 received from time slave S2 and time adjustment value $\Delta T_{M-1}$ calculated through the previous time synchronization processing for the equation (11). Time slave S1 stores calculated maximum time adjustment value ΔTmax1 in the Pdelay_Req message transmitted to time master M.

When receiving the Pdelay_Req message, time master M extracts maximum time adjustment value ΔTmax1 stored in the Pdelay_Req message. Time master M transmits the Pdelay_Resp message and the Pdelay_Resp_followup message to time slave S1. Time slave S1 calculates time adjustment value $\Delta T_{M-1}$, and corrects the time of the slave clock of the own device using calculated time adjustment value $\Delta T_{M-1}$.

Time master M transfers maximum time adjustment value ΔTmax1 received from time slave S1 to control device 100 (control master). Control device 100 determines whether the time synchronization of time slaves S1 to S3 is completed based on maximum time adjustment value ΔTmax1. When maximum time adjustment value ΔTmax1 is less than the threshold, control device 100 determines that the time synchronization of time slaves S1 to S3 is completed, and starts the transmission of the control-system data with time slaves S1 to S3.

On the other hand, when maximum time adjustment value ΔTmax1 is greater than the threshold, control device 100 determines that the time synchronization of time slaves S1 to S3 is not completed, and does not start the transmission of control-system data. When the data transmission is currently performed, control device 100 stops the transmission of the control-system data.

(g3. Third Modification of Communication System)

The configuration example in which time master M (control device 100) and time slaves S1 to S3 (devices 200A to 200C) are sequentially connected to network 2 in the daisy chain is described in communication system 1 of FIG. 1. However, the connection form between time master M and time slaves S1 to S3 of network 2 is not limited to this configuration. For example, a configuration example in which the connection form between time master M and time slaves S1 to S3 of network 2 is a star type will be described.

Figure 22:
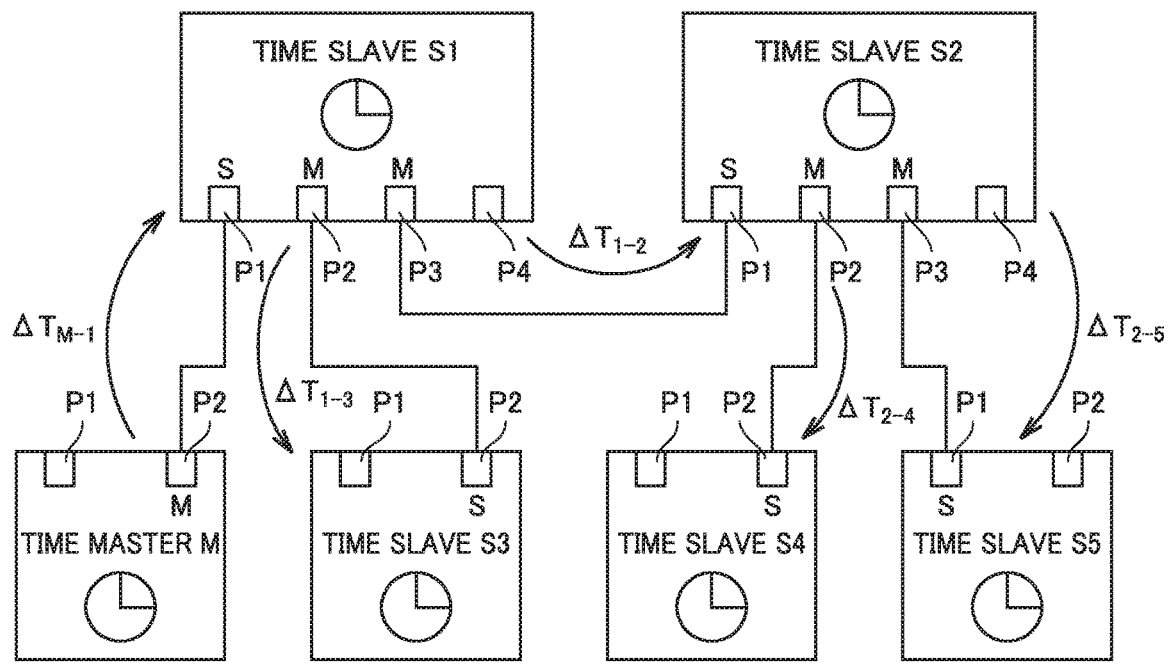
FIG. 22 is a view schematically illustrating a configuration of a communication system according to a third modification of the embodiment.

FIG. 22 is a view schematically illustrating a configuration of communication system 1 according to a third modification of the embodiment. In the configuration example of FIG. 22, time master M and a plurality of time slaves S1 to S5 are connected to network 2. Time master M and time slaves S3 to S5 each include ports P1, P2. Each of time slaves S1, S2 includes ports P1 to P4. Port P1 of time slave S1 is connected to port P2 of time master M, port P2 of time slave S1 is connected to port P2 of time slave S3, and port P3 of time slave S1 is connected to port P1 of time slave S2. Port P2 of time slave S2 is connected to port P2 of time slave S4, and port P3 of time slave S2 is connected to port P1 of time slave S5.

Also in the configuration example of FIG. 22, the time synchronization processing is performed using the P2P transparent clock, whereby the slave clocks of time slaves S1 to S5 are time-synchronized with the master clock of time master M.

Specifically, time slave S1 performs the time synchronization processing in FIG. 5 with time master M connected to port P1 (slave port), thereby calculating difference $\Delta T_{M-1}$ between the time of the clock (master clock) of the time master M and the time of the clock (slave clock) of the own device. Time slave S1 corrects the time of the timer of the own device using difference $\Delta T_{M-1}$ as the time adjustment value.

Time slave S2 performs the time synchronization processing in FIG. 5 with time slave S1 connected to port P1 (slave port), thereby calculating difference $\Delta T_{1-2}$ between the time of the clock of time slave S1 and the time of the clock of the own device. Time slave S2 corrects the time of the clock of the own device using difference $\Delta T_{2-1}$ as the time adjustment value.

Time slave S3 performs the time synchronization processing in FIG. 5 with time slave S1 connected to port P2 (slave port), thereby calculating difference $\Delta T_{1-3}$ between the time of the clock of time slave S1 and the time of the clock of the own device. Time slave S3 corrects the time of the clock of the own device using difference $\Delta T_{1-3}$ as the time adjustment value.

Time slave S4 performs the time synchronization processing in FIG. 5 with time slave S2 connected to port P2 (slave port), thereby calculating difference $\Delta T_{2-4}$ between the time of the clock of time slave S2 and the time of the clock of the own device. Time slave S4 corrects the time of the clock of the own device using difference $\Delta T_{2-4}$ as the time adjustment value.

Time slave S5 performs the time synchronization processing in FIG. 5 with time slave S2 connected to port P1 (slave port), thereby calculating difference $\Delta T_{2-5}$ between the time of the clock of time slave S2 and the time of the clock of the own device. Time slave S5 corrects the time of the clock of the own device using difference $\Delta T_{2-5}$ as the time adjustment value.

In this way, each of time slaves S1 to S5 corrects the time of the clock of the own device using difference $\Delta T$ between the time of the clock of the communication device connected adjacent to the master side and the time of the clock of the own device as the time adjustment value, whereby the time synchronization is finally implemented between time master M and all time slaves S1 to S5. When the time synchronization of entire communication system 1 is completed, the transmission of the control-system data can be started between the plurality of communication devices.

Each of time slaves S1 to S5 includes the "communication unit" that notifies time master M of the time synchronization information of the slave clock of the own device. With this configuration, time master M can determine whether the time synchronization between time master M and time slaves S1 to S3 is completed based on the time synchronization information of which each of time slaves S1 to S5 notifies time master M.

Figure 23:
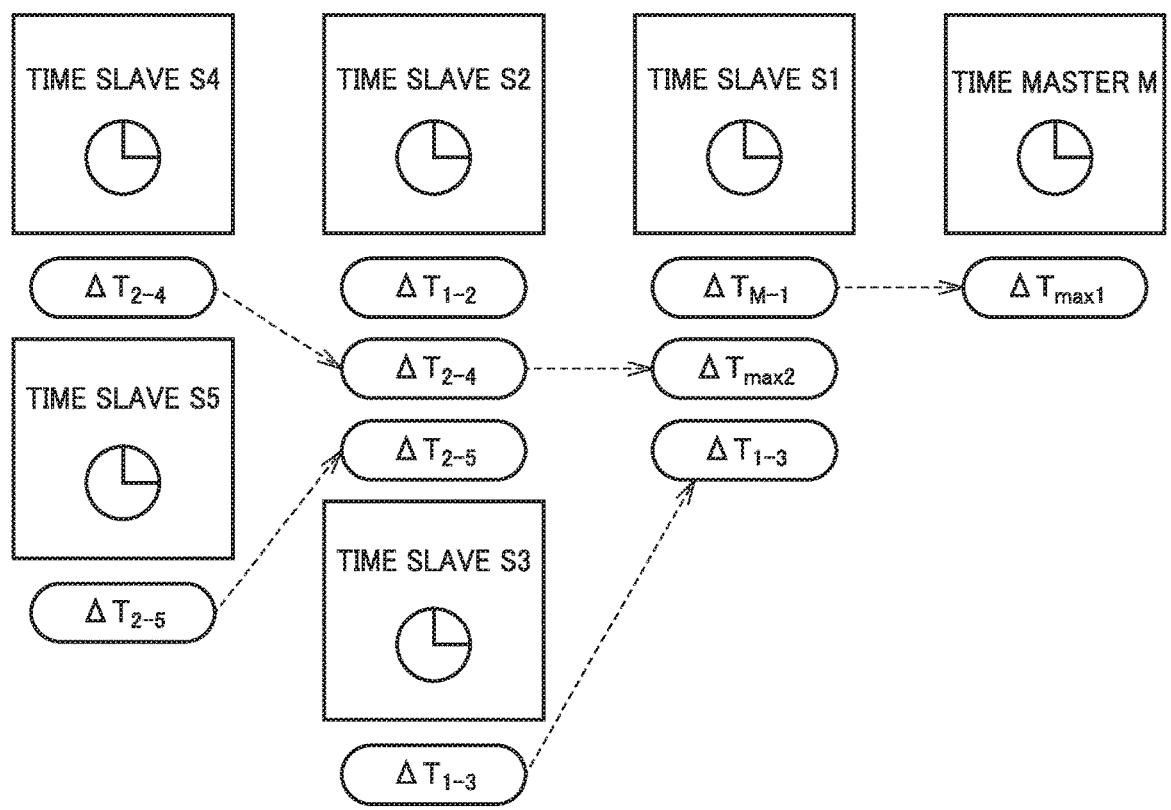
FIG. 23 is a view schematically illustrating a configuration example of the communication unit of each time slave in the communication system in FIG. 22.

FIG. 23 is a view schematically illustrating a configuration example of the communication unit of each time slave in communication system 1 in FIG. 22. The communication unit of each slave is configured to make a notification of a time adjustment value $\Delta T$ used for the time correction of the slave clock of the own device as the time synchronization information.

With reference to FIG. 23, time slave S4 performs the time synchronization processing with time slave S2, thereby calculating difference $\Delta T_{2-4}$ of the time of time slave S4 to the time of time slave S2. Time slave S4 notifies time slave S2 of calculated time adjustment value $\Delta T_{2-4}$.

Time slave S5 performs the time synchronization processing with time slave S2, thereby calculating a difference $\Delta T_{2-5}$ of the time of time slave S5 to the time of time slave S2. Time slave S5 notifies time slave S2 of calculated time adjustment value $\Delta T_{2-5}$.

Time slave S2 performs the time synchronization processing with time slave S1, thereby calculating a difference $\Delta T_{1-2}$ of the time of time slave S2 to the time of time slave S1. Time slave S2 compares time adjustment value $\Delta T_{2-4}$ received from time slave S4, time adjustment value $\Delta T_{2-5}$ received from time slave S5, and calculated time adjustment value $\Delta T_{1-2}$ to one another. Specifically, time slave S2 compares absolute value $|\Delta T_{2-4}|$ of time adjustment value $\Delta T_{2-4}$, absolute value $|\Delta T_{2-5}|$ of time adjustment value $\Delta T_{2-5}$, and absolute value $|\Delta T_{1-2}|$ of time adjustment value $\Delta T_{1-2}$ to one another, and selects the greatest absolute value (maximum time adjustment value $\Delta T\text{max}2$). Maximum time adjustment value $\Delta T\text{max}2$ is given by the following equation (16). Time slave S2 notifies time slave S1 of maximum time adjustment value $\Delta T\text{max}2$.

$$\Delta T\text{max}2 = \text{Max}\{|\Delta T_{2-4}|, |\Delta T_{2-5}|, |\Delta T_{1-2}|\} \tag{16}$$

Time slave S3 performs the time synchronization processing with time slave S1, thereby calculating a difference $\Delta T_{1-3}$ of the time of time slave S3 to the time of time slave S1. Time slave S3 notifies time slave S1 of calculated time adjustment value $\Delta T_{1-3}$.

Time slave S1 performs the time synchronization processing with time master M, thereby calculating difference $\Delta T_{M-1}$ of the time of time slave S1 to the time of time master M. Time slave S1 compares maximum time adjustment value $\Delta T\text{max}2$ received from time slave S2, absolute value $|\Delta T_{1-3}|$ of time adjustment value $\Delta T_{1-3}$, and absolute value $|\Delta T_{M-1}|$ of time adjustment value $\Delta T_{M-1}$ to one another, and selects the greatest absolute value (maximum time adjustment value $\Delta T\text{max}1$). Maximum time adjustment value $\Delta T\text{max}1$ is given by the following equation (17). Time slave S1 notifies time master M of maximum time adjustment value $\Delta T\text{max}1$.

$$\Delta T\text{max}1 = \text{Max}\{|\Delta T_{M-1}|, |\Delta T_{1-3}|, \Delta T\text{max}2\} \tag{17}$$

At this point, according to the equations (16) and (17), maximum time adjustment value $\Delta T\text{max}1$ can be represented as the following equation (18).

$$\Delta T\text{max}1 = \text{Max}\{|\Delta T_{2-4}|, |\Delta T_{2-5}|, |\Delta T_{1-2}|, |\Delta T_{1-3}|, |\Delta T_{M-1}|\} \tag{18}$$

As can be seen from the equation (18), time master M is notified of the greatest one in the absolute values of time adjustment values $\Delta T_{2-4}$, $\Delta T_{2-5}$, $\Delta T_{1-2}$, $\Delta T_{1-3}$, $\Delta T_{M-1}$ of time slaves S1 to S5 as maximum time adjustment value $\Delta T\text{max}1$.

Time master M determines whether the time synchronization of time slaves S1 to S5 is completed based on maximum time adjustment value $\Delta T\text{max}1$. Time master M sets a threshold used for determining whether the time synchronization is completed to a value obtained by dividing predetermined allowable time accuracy in communication system 1 by the maximum number of paths. In the example of FIG. 22, the maximum number of paths is 3. Thus, the threshold is set to one-third the allowable time accuracy.

Time master M compares maximum time adjustment value ΔTmax1 to the threshold, and determines that the time synchronization of time slaves S1 to S5 is completed when maximum time adjustment value ΔTmax1 is less than the threshold. When determining that the time synchronization is completed, time master M starts the transmission of control-system data with time slaves S1 to S5. On the other hand, when maximum time adjustment value ΔTmax1 is greater than the threshold, time master M determines that the time synchronization of time slaves S1 to S5 is not completed, and does not start the transmission of the control-system data.

When maximum time adjustment value ΔTmax1 of which time master M is notified exceeds the threshold during the performance of the data transmission, time master M determines that the time synchronization between time master M and time slaves S1 to S5 fails, and stops the transmission of the control-system data. With this configuration, in the data transmission of communication system 1 in FIG. 22, control device 100 can stably manage the transmission and reception timing of the control-system data of the plurality of devices 200.

FIG. 24 is a view schematically illustrating a first configuration example of communication system 1 to which the communication form in FIG. 22 is applied.

In the first configuration example of FIG. 24, communication system 1 includes a plurality of control devices 100A and 100B and a plurality of devices 200A to 200D. Devices 200A, 200B are star-connected to network 2 (field network) connected to control device 100A, and devices 200C, 200D are star-connected to network 2 connected to control device 100B. Each of control devices 100A, 100B functions as the control master that manages the data transmission in network 2. Each of devices 200A to 200D functions as the control slave that performs the data transmission according to an instruction from corresponding control device 100.

Control device 100A and control device 100B are connected to each other through a network 3. Network 3 is a control-level network constructing a link that can transmit the data between control devices 100A and 100B. Network 2 provides the transmission of the information about the control system as a main function.

In the first configuration example of FIG. 24, the time synchronization is performed among the plurality of control devices 100A to 100D while the time synchronization is performed between control device 100 connected to each network 2 and the plurality of devices 200, whereby the time synchronization is performed among the plurality of devices 200A to 200D connected to different control devices 100. Consequently, the plurality of devices 200 connected to different control devices 100 can be operated in cooperation with each other.

In the example of FIG. 24, one of timers 101A and 101B included in control devices 100A and 100B is caused to function as the master clock (time master M) of entire communication system 1. As an example, in FIG. 24, timer 101A of control device 100A is set to the master clock. The timers (corresponding to time slaves S1 to S5) of remaining control device 100B and devices 200A to 200D are time-synchronized with the master clock of time master M.

Also in the configuration example of FIG. 24, the time synchronization processing is performed using the P2P transparent clock, whereby the slave clocks of time slaves S are time-synchronized with the master clock of time master M. Consequently, control devices 100A, 100B and devices 200A to 200D can be time-synchronized with each other.

Each time slave S performs the time synchronization processing with another communication device connected adjacent to the master side, and notifies control device 100A that is time master M of time accuracy information about the own device (the time adjustment value of the own device). Control device 100A determines whether the time synchronization of all time slaves S (control device 100B and devices 200A to 200D) is completed based on the time synchronization information of which each time slave S notifies control device 100A. When determining that the time synchronization is completed, control device 100A starts the transmission of control-system data between the plurality of time slaves S.

With this configuration, each of control devices 100A, 100B connected to network 3 can manage the data transmission with the plurality of devices 200 through network 2 based on the time of the timer time-synchronized with another control device. Thus, the timings of collecting the input data or the timings of transmitting the output data of control devices 100A, 100B can be synchronized with each other. The timings of exchanging the data of control devices 100A, 100B can be synchronized with each other. As a result, the control timings of the plurality of devices 200A to 200D can be synchronized with one another, so that cooperative control of the plurality of devices 200A to 200D can be achieved.

Figure 25:
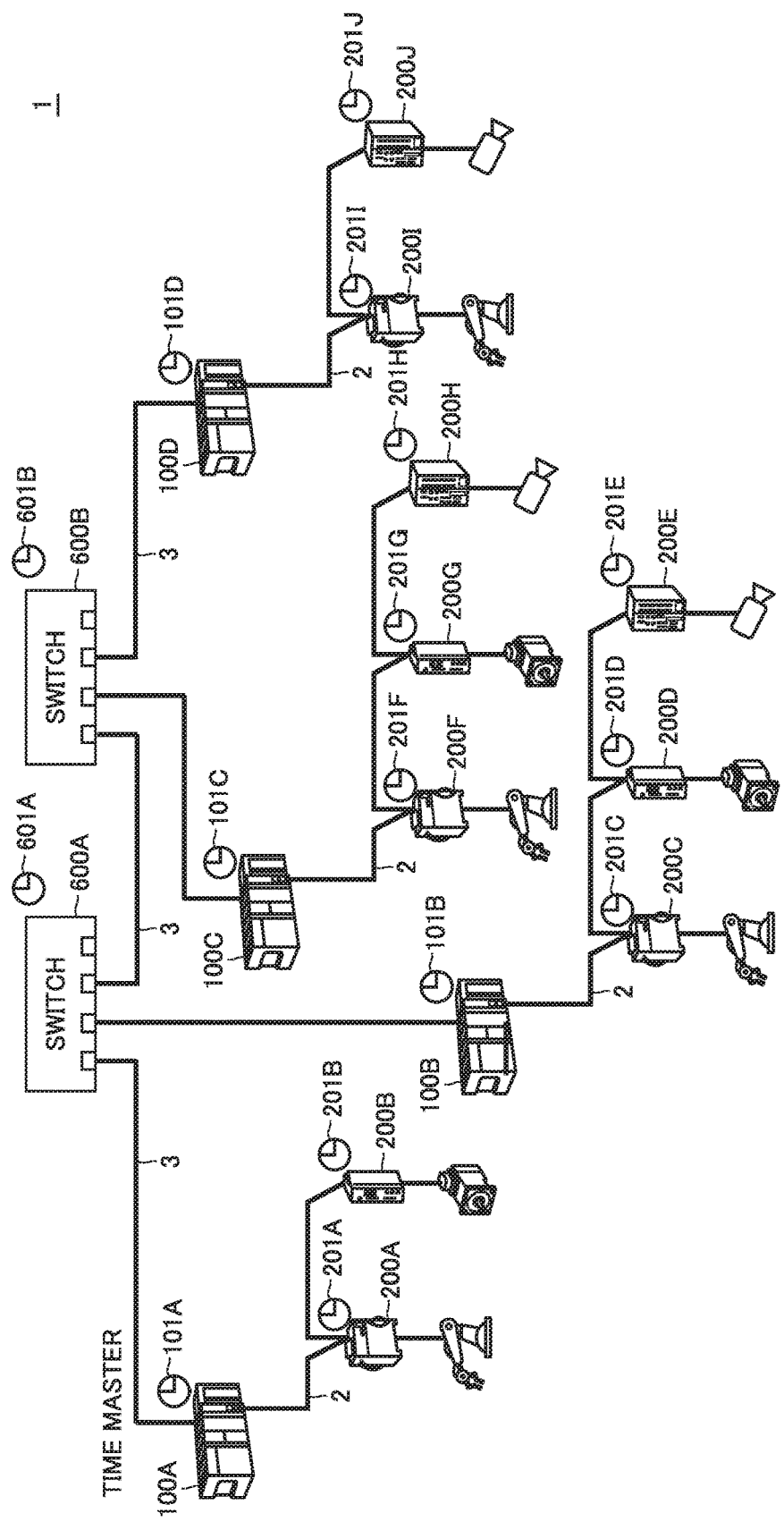
FIG. 25 is a view schematically illustrating a second configuration example of the communication system to which the communication unit in FIG. 23 is applied.

FIG. 25 is a view schematically illustrating a second configuration example of communication system 1 to which the communication form in FIG. 22 is applied.

In the second configuration example of FIG. 25, communication system 1 includes a plurality of control devices 100A to 100D, a plurality of devices 200A to 200J, and a plurality of switches 600A, 600B.

Devices 200A, 200B are connected to network 2 (field network) connected to control device 100A in the daisy chain, and devices 200C to 200E are connected to network 2 connected to control device 100B in the daisy chain. Devices 200F to 200H are connected to network 2 (field network) connected to control device 100C in the daisy chain, and devices 200I, 200J are connected to network 2 connected to control device 100D in the daisy chain.

Each of control devices 100A to 100D functions as the control master that manages the data transmission in network 2. Each of devices 200A to 200J functions as the control slave that performs the data transmission according to an instruction from corresponding control device 100.

Control devices 100A, 100B are connected to switch 600A through network 3. Control devices 100C, 100D are connected to switch 600B through network 3. Switch 600A and switch 600B are connected to each other. Switch 600A includes a timer 601A, and switch 600B includes a timer 601B.

Network 3 is a control-level network constructing a link that can transmit the data among control devices 100A to 100D. Network 2 provides the transmission of the information about the control system as a main function.

In the second configuration example of FIG. 25, the time synchronization is performed between the plurality of control devices 100A to 100D and the plurality of switches 600A, 600B while the time synchronization is performed between control device 100 connected to each network 2 and the plurality of devices 200, whereby the time synchronization is performed among the plurality of devices 200A to 200J connected to different control devices 100. Consequently, the plurality of devices 200 connected to different control devices 100 can be operated in cooperation with each other.

In the example of FIG. 25, one of timers 101A to 101D, 601A, 601B included in control devices 100A to 100D and switches 600A, 600B is caused to function as the master clock (time master M) of entire communication system 1. As an example, in FIG. 25, timer 101A of control device 100A is set to the master clock. The timers (corresponding to time slaves S1 to S5) of remaining control devices 100B to 100D and switches 600A, 600B are time-synchronized with the master clock of time master M.

Also in the configuration example of FIG. 25, the time synchronization processing is performed using the P2P transparent clock, whereby the slave clocks of time slaves S (control devices 100B to 100D and switches 600A, 600B) are time-synchronized with the master clock of time master M. Consequently, control devices 100A to 100D and switches 600A, 600B can be time-synchronized with each other.

When the time synchronization processing is completed, each of control devices 100A to 100D performs the time synchronization processing with device 200 connected through network 2. In the time synchronization processing performed by each of control devices 100A to 100D, a time synchronization protocol different from the above time synchronization processing is used depending on network 2. For example, EtherCAT (registered trademark) that is an example of a machine control network can be used.

Even in the second configuration example, each time slave S performs the time synchronization processing with another communication device connected adjacent to the master side, and notifies control device 100A that is time master M of time accuracy information about the own device (the time adjustment value of the own device). Control device 100A determines whether the time synchronization of all time slaves S is completed based on the time synchronization information of which each time slave S (control devices 100B to 100D and switches 600A, 600B) notifies control device 100A. When determining that the time synchronization is completed, control device 100A starts the transmission of control-system data between the plurality of time slaves S.

With this configuration, each of control devices 100A to 100D connected to network 3 can manage the data transmission with the plurality of devices 200 through network 2 based on the time of the timer time-synchronized with another control device. Thus, the timings of collecting the input data or the timings of transmitting the output data of control devices 100A to 100D can be synchronized with one another. The timings of exchanging the data of control devices 100A to 100D can be synchronized with one another. As a result, the control timings of the plurality of devices 200A to 200J can be synchronized with one another, so that cooperative control of the plurality of devices 200A to 200J can be achieved.

H. APPENDIX

The above embodiment includes the following technical ideas.

[Configuration 1] A communication system (1) in which a plurality of communication devices (M, S1 to S3) are connected to a network (2),
wherein
the plurality of communication devices includes:
a time master (M) including a master clock configured to manage time of the communication system; and
a plurality of time slaves (Si to S3) each of which includes a slave clock time-synchronized with the master clock, and
each of the plurality of time slaves includes:
a synchronization unit configured to perform time synchronization with another communication device connected adjacent to a master side on the network; and
a communication unit configured to notify the time master of time synchronization information indicating time synchronization accuracy of the own device obtained by the synchronization unit.

[Configuration 2] The communication system described in the configuration 1, wherein the synchronization unit corrects time of the own device using a difference between time of the other communication device and the time of the own device as a time adjustment value (ΔT), and
the communication unit notifies the time master of the time adjustment value as the time synchronization information.

[Configuration 3] The communication system described in the configuration 2, wherein the communication unit receives the time adjustment value from another communication device connected adjacent to a slave side on the network, and transfers the time adjustment value having a greater one in absolute values of the received time adjustment value and the time adjustment value of the own device to the other communication device connected adjacent to the master side.

[Configuration 4] The communication system described in the configuration 2, wherein the communication unit receives the time adjustment value from another communication device connected adjacent to a slave side on the network, and transfers the received time adjustment value and the time adjustment value of the own device to the other communication device connected adjacent to the master side.

[Configuration 5] The communication system described in the configuration 2, wherein the communication unit receives the time adjustment value from another communication device connected adjacent to a slave side on the network, and transfers a sum of the received time adjustment value and the time adjustment value of the own device to the other communication device connected adjacent to the master side.

[Configuration 6] The communication system described in any one of the configurations 3 to 5, wherein the synchronization unit periodically performs time synchronization processing of correcting the time of the own device by exchanging a time synchronization packet with the other communication device, and
the communication unit stores the time adjustment value to be transferred to the other communication device in the time synchronization packet to be transmitted to the other communication device.

[Configuration 7] The communication system described in any one of the configurations 1 to 6, wherein the time master is a control device configured to manage data transmission in the network,
each of the plurality of time slaves is a device configured to perform the data transmission according to an instruction from the time master, and
the control device determines whether the time synchronization with the plurality of devices is completed based on the time synchronization information of which the plurality of devices notify the control device, and starts the data transmission in the network when determining that the time synchronization is completed.

[Configuration 8] The communication system described in any one of the configurations 1 to 6, wherein one of the plurality of time slaves is a control device configured to manage data transmission in the network, the remaining time slaves and the time master are each a device configured to perform the data transmission according to an instruction from the control device, the time master determines whether the time synchronization with the plurality of time slaves is completed based on the time synchronization information of which the plurality of time slaves notify the time master, and notifies the control device of a determination result, and the control device starts the data transmission in the network when determining that the time synchronization is completed from the determination result.

[Configuration 9] The communication system described in any one of the configurations 1 to 6, wherein one of the plurality of time slaves is a control device configured to manage data transmission in the network, the remaining time slaves and the time master are each a device configured to perform the data transmission according to an instruction from the control device, the time master transfers the time synchronization information of which the plurality of time slaves notify the time master to the control device, and the control device determines whether the time synchronization with the plurality of devices is completed based on the synchronization information, and starts the data transmission in the network when determining that the time synchronization is completed.

[Configuration 10] The communication system described in the configuration 1 or 2, wherein the synchronization unit periodically performs time synchronization processing of correcting the time of the own device by exchanging a time synchronization packet with the other communication device, and the communication unit notifies the master device of the time synchronization information after the performance of the time synchronization processing.

[Configuration 11] A communication device network-connected to a communication system, the communication device including:

a slave clock time-synchronized with a master clock configured to manage time of the communication system;

a synchronization unit configured to perform time synchronization with another communication device connected adjacent to a master side on the network; and a communication unit configured to notify a time master including the master clock of time synchronization information indicating time synchronization accuracy of the own device obtained by the synchronization unit.

[Configuration 12] A communication method in a communication system in which a plurality of communication devices are connected to a network, the plurality of communication devices including:

a time master including a master clock configured to manage time of the communication system; and a plurality of time slaves each of which includes a slave clock time-synchronized with the master clock, the communication method including:

time-synchronizing each of the plurality of time slaves with another communication device connected adjacent to a master side on the network; and notifying, by each of the plurality of slave devices, the time master of time synchronization information indicating time synchronization accuracy of the slave device.

I. ADVANTAGES

In communication system 1 of the embodiment, each of the plurality of time slaves includes a "communication unit" that notifies the time master of time synchronization information indicating the time synchronization accuracy of the slave clock of the own device. With this configuration, the time master can determine whether the time synchronization between the own device and the plurality of time slaves is completed based on the time synchronization information of which each time slave notifies the time master. As a result, the data transmission can be started in timing of completing the time synchronization in entire communication system 1. Thus, the data transmission can more quickly be started as compared with a configuration in which the data transmission is started in timing at which the set time elapses after the power-on.

During the performance of the data transmission, the time master can monitor the time synchronization accuracy of each of the plurality of time slaves based on the time synchronization information of which each time slave notifies the time master, so that the data transmission can immediately be stopped when the time lag with any one of the time slaves is generated. This enables avoidance of a possibility that the timing at which the time slave acquires input data and the timing at which the time slave outputs output data vary depending on the time lag.

It should be considered that the disclosed embodiments are an example in all respects and not restrictive. The scope of the present invention is defined by not the above description, but the claims, and it is intended that all modifications within the meaning and scope of the claims are included in the present invention.

REFERENCE SIGNS LIST

1: communication system, 2: network, 100, 100A to 100D: control device, 101, 101A to 101D, 201A to 201J, 601A, 601B: timer, 200A to 200J: device, M: time master, S1 to S5: time slave, 102, 202: processor, 104, 204: memory, 106, 206: storage, 107: system program, 108: user application program, 110: network controller, 111, 211: reception circuit, 112: reception buffer, 113, 212: transmission and reception controller, 115, 213: transmission circuit, 210: communication circuit, 500: support device, 600A, 600B: switch

The invention claimed is:

1. A communication system in which a plurality of communication devices are connected to a network,
wherein
the plurality of communication devices includes:
a time master including a master clock that manages time of the communication system; and
a plurality of time slaves each of which includes a slave clock that is time-synchronized with the master clock,
each time slave of the plurality of time slaves includes:
a synchronization module that performs time synchronization with a first communication device connected adjacent to the each time slave at a master side on the network; and
a communication module that notifies the time master of time synchronization information indicating time synchronization accuracy of the each time slave obtained by the synchronization module, the synchronization module corrects time of the each time slave by using a difference between time of the first communication device and the time of the each time slave as a time adjustment value, and the communication module notifies the time master of the time adjustment value as the time synchronization information.

2. The communication system according to claim 1, wherein the communication module receives the time adjustment value from a second communication device that is connected adjacent to the each time slave at a slave side on the network, and transfers either one of the received time adjustment value or the time adjustment value of the each time slave to the first communication device, the transferred time adjustment value having a greater one in absolute values of the received time adjustment value and the time adjustment value of the each time slave.

3. The communication system according to claim 2, wherein the synchronization module periodically performs time synchronization processing of correcting the time of the each time slave by exchanging a time synchronization packet with the first communication device, and the communication module stores the time adjustment value to be transferred to the first communication device in the time synchronization packet to be transmitted to the first communication device.

4. The communication system according to claim 1, wherein the communication module receives the time adjustment value from a second communication device connected adjacent to the each time slave at a slave side on the network, and transfers the received time adjustment value and the time adjustment value of the each time slave to the first communication device.

5. The communication system according to claim 1, wherein the communication module receives the time adjustment value from a second communication device connected adjacent to the each time slave at a slave side on the network, and transfers a sum of the received time adjustment value and the time adjustment value of the each time slave to the first communication device.

6. The communication system according to claim 1, wherein the time master is a control device that manages data transmission in the network, the each time slave is a device that performs the data transmission according to an instruction from the control device, and the control device determines whether the time synchronization with the plurality of devices is completed based on the time synchronization information of which the plurality of devices notify the control device, and starts the data transmission in the network when the time synchronization is determined to be completed.

7. The communication system according to claim 1, wherein one of the plurality of time slaves is a control device that manages data transmission in the network, remaining time slaves of the plurality of time slaves and the time master are each a device that performs the data transmission according to an instruction from the control device, the time master determines whether the time synchronization with the plurality of time slaves is completed based on the time synchronization information of which the plurality of time slaves notify the time master, and notifies the control device of a determination result, and the control device starts the data transmission in the network when the time synchronization is determined to be completed from the determination result.

8. The communication system according to claim 1, wherein one of the plurality of time slaves is a control device that manages data transmission in the network, remaining time slaves of the plurality of time slaves and the time master are each a device that performs the data transmission according to an instruction from the control device, the time master transfers the time synchronization information of which the plurality of time slaves notify the time master to the control device, and the control device determines whether the time synchronization with the plurality of devices is completed based on the time synchronization information, and starts the data transmission in the network when the time synchronization is determined to be completed.

9. The communication system according to claim 1, wherein the synchronization module periodically performs time synchronization processing of correcting the time of the each time slave by exchanging a time synchronization packet with the first communication device, and the communication module notifies the time master of the time synchronization information after the performance of the time synchronization processing.

10. A communication device network-connected to a communication system including a time master that includes a master clock that manages time of the communication system, the communication device comprising:

a slave clock that is time-synchronized with the master clock;

a synchronization module that performs time synchronization with a first communication device connected adjacent to the communication device at a master side on the network; and a communication module that notifies the time master of time synchronization information that indicates time synchronization accuracy of the communication device obtained by the synchronization module, wherein the synchronization module corrects time of the communication device by using a difference between time of the first communication device and the time of the communication device as a time adjustment value, and the communication module notifies the time master of the time adjustment value as the time synchronization information.

11. A communication method in a communication system in which a plurality of communication devices are connected to a network, the plurality of communication devices including:
- a time master including a master clock that manages time of the communication system; and
- a plurality of time slaves each of which includes a slave clock that is time-synchronized with the master clock, the communication method comprising:
- time-synchronizing each time slave of the plurality of time slaves with a first communication device connected adjacent to the each time slave at a master side on the network; and
- notifying the time master of time synchronization information that indicates time synchronization accuracy of the each time slave, wherein
- the time-synchronizing includes correcting time of the each time slave by using a difference between time of the first communication device and the time of the each time slave as a time adjustment value, and
- the notifying the time master includes notifying the time master of the time adjustment value of the each time slave as the time synchronization information.

* * * * *